(12) United States Patent
Knight et al.

(10) Patent No.: US 12,655,827 B2
(45) Date of Patent: Jun. 16, 2026

(54) WIND TURBINE ASSEMBLIES AND DEPLOYMENT METHODS

(71) Applicants: John R. Knight, San Diego, CA (US); Jonathan Knight, San Diego, CA (US)

(72) Inventors: John R. Knight, San Diego, CA (US); Jonathan Knight, San Diego, CA (US)

(73) Assignee: Uprise Energy, LLC, San Diego, CA (US)

( * ) Notice: Subject to any disclaimer, the term of this patent is extended or adjusted under 35 U.S.C. 154(b) by 0 days.

(21) Appl. No.: 18/769,465

(22) Filed: Jul. 11, 2024

(65) Prior Publication Data

US 2026/0015993 A1      Jan. 15, 2026

(51) Int. Cl.
*F03D 13/20* (2016.01)

(52) U.S. Cl.
CPC .. *F03D 13/2005* (2023.08); *F05B 2240/9151* (2013.01); *F05B 2240/94* (2013.01); *F05B 2260/90* (2013.01)

(58) Field of Classification Search
CPC . F03D 9/32; F03D 13/10; F03D 13/20; F03D 13/2005; F03D 13/40; F05B 2240/94; F05B 2240/941; F05B 2240/9151; B66F 3/10; B66F 3/28; B66F 9/0655; B66F 9/07559; B66F 11/046; B66F 2700/057
See application file for complete search history.

(56) References Cited

U.S. PATENT DOCUMENTS

| | | | |
|---|---|---|---|
| 2,152,576 A | 3/1939 | Weeks | |
| 2,629,450 A | 2/1953 | Fumagalli | |
| (Continued) | | | |

FOREIGN PATENT DOCUMENTS

| | | | |
|---|---|---|---|
| CN | 208546265 U | 5/2018 | |
| EP | 2821635 A1 | 1/2015 | |
| WO | WO 2013/071341 A1 | 5/2013 | |

OTHER PUBLICATIONS

International Search Report and Written Opinion mailed Oct. 8, 2014 in connection with International Patent Application No. PCT/US2014/041733.

(Continued)

*Primary Examiner* — Christopher R Legendre
(74) *Attorney, Agent, or Firm* — Eric L. Lane; Green Patent Law

(57) ABSTRACT

Wind energy assemblies and deployment methods are provided that include a telescoping mast, an energy conversion system, and a carriage assembly. The telescoping mast has a top and a bottom, a mast roller system, and a plurality of mast sections. At least one of the mast sections is an internal mast section, and at least one of the mast sections is an external mast section. The energy conversion system is mounted to the top of the telescoping mast and includes a steering system, a wind instrument mast, a drive assembly, a rotor hub, a disc brake, and a plurality of blades extending from the rotor hub. The carriage assembly supports the telescoping mast. The mast roller system enables the at least one internal mast section to be pulled out from the at least one external mast section, thereby facilitating extension of the telescoping mast. A hydraulic ram assembly may be provided to rotate the telescoping mast to a vertical position.

14 Claims, 21 Drawing Sheets

(56) References Cited

U.S. PATENT DOCUMENTS

| | | | | |
|---|---|---|---|---|
| 3,635,359 | A * | 1/1972 | Fisher | A01D 90/08 |
| | | | | 414/789.3 |
| 4,651,017 | A | 3/1987 | Longrigg | |
| 5,183,383 | A | 2/1993 | Baas | |
| 5,417,540 | A * | 5/1995 | Cox | B60P 1/6427 |
| | | | | 414/537 |
| 5,718,087 | A | 2/1998 | Featherstone | |
| 6,320,272 | B1 | 11/2001 | Lading et al. | |
| 6,849,965 | B2 | 2/2005 | Le Nabour | |
| 7,432,610 | B2 | 10/2008 | Wobben | |
| 8,239,071 | B2 | 8/2012 | Lausen | |
| 8,277,167 | B2 | 10/2012 | Shibata et al. | |
| 8,295,033 | B2 * | 10/2012 | Van Straten | H02S 20/30 |
| | | | | 290/55 |
| 8,299,645 | B2 * | 10/2012 | Muchow | F03D 13/10 |
| | | | | 290/55 |
| 8,854,794 | B2 * | 10/2014 | Van Straten | F24S 25/10 |
| | | | | 290/55 |
| 8,915,697 | B2 * | 12/2014 | Pitre | F03D 13/20 |
| | | | | 415/908 |
| 8,959,870 | B2 * | 2/2015 | Schmidt | F03D 13/20 |
| | | | | 52/118 |
| 9,353,730 | B2 | 5/2016 | Knight | |
| 9,441,612 | B2 * | 9/2016 | Haar | E04B 1/34336 |
| D797,367 | S * | 9/2017 | Hart | D26/140 |
| 9,791,118 | B2 * | 10/2017 | Carpoff | F21S 9/043 |
| 2003/0071467 | A1 | 4/2003 | Calley et al. | |
| 2004/0041409 | A1 | 3/2004 | Gabrys | |
| 2006/0067827 | A1 | 3/2006 | Moroz | |
| 2007/0248466 | A1 | 10/2007 | Lotrionte | |
| 2008/0103611 | A1 | 5/2008 | Altemark | |
| 2008/0185235 | A1 | 8/2008 | Suzuki | |
| 2009/0099702 | A1 | 4/2009 | Vyas | |
| 2009/0295159 | A1 | 12/2009 | Johnson | |
| 2009/0311099 | A1 | 12/2009 | Richards | |
| 2010/0060002 | A1 | 3/2010 | Gabrys | |
| 2010/0092291 | A1 | 4/2010 | Scholte-Wassink | |
| 2010/0117369 | A1 | 5/2010 | Monostory | |
| 2010/0133817 | A1 | 6/2010 | Kinzie | |
| 2010/0158687 | A1 | 6/2010 | Dawson et al. | |
| 2010/0207452 | A1 * | 8/2010 | Saab | F03D 9/11 |
| | | | | 307/65 |
| 2010/0290912 | A1 | 11/2010 | Sorensen | |
| 2011/0031760 | A1 | 2/2011 | Lugg | |
| 2011/0148112 | A1 | 6/2011 | Ormel et al. | |
| 2011/0176256 | A1 | 7/2011 | Van Straten | |
| 2012/0026320 | A1 * | 2/2012 | Bryceland | G08G 5/22 |
| | | | | 348/135 |
| 2012/0179376 | A1 | 7/2012 | O'Brien et al. | |
| 2013/0183161 | A1 | 7/2013 | Richtman et al. | |
| 2013/0284608 | A1 | 10/2013 | Blake et al. | |
| 2014/0091650 | A1 | 4/2014 | Lenschow | |
| 2015/0247953 | A1 | 9/2015 | O'Brien et al. | |
| 2016/0108893 | A1 * | 4/2016 | Agtuca | F03D 9/11 |
| | | | | 290/44 |
| 2016/0333853 | A1 | 11/2016 | Knight | |
| 2026/0015993 | A1 * | 1/2026 | Knight | F03D 13/2005 |

OTHER PUBLICATIONS

Invitation to Pay Additional Fees and, Where Applicable, Protest Fee, sent Aug. 11, 2025 in related International Application No. PCT/US2025/033864.

International Search Report sent Oct. 7, 2025 in related International Application No. PCT/US2025/033864.

Written Opinion sent Oct. 7, 2025 in related International Application No. PCT/US2025/033864.

* cited by examiner

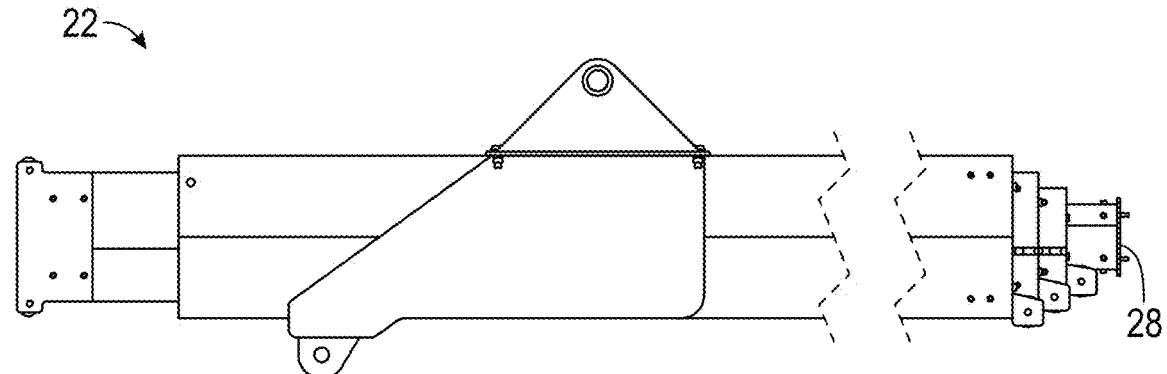
FIG. 2
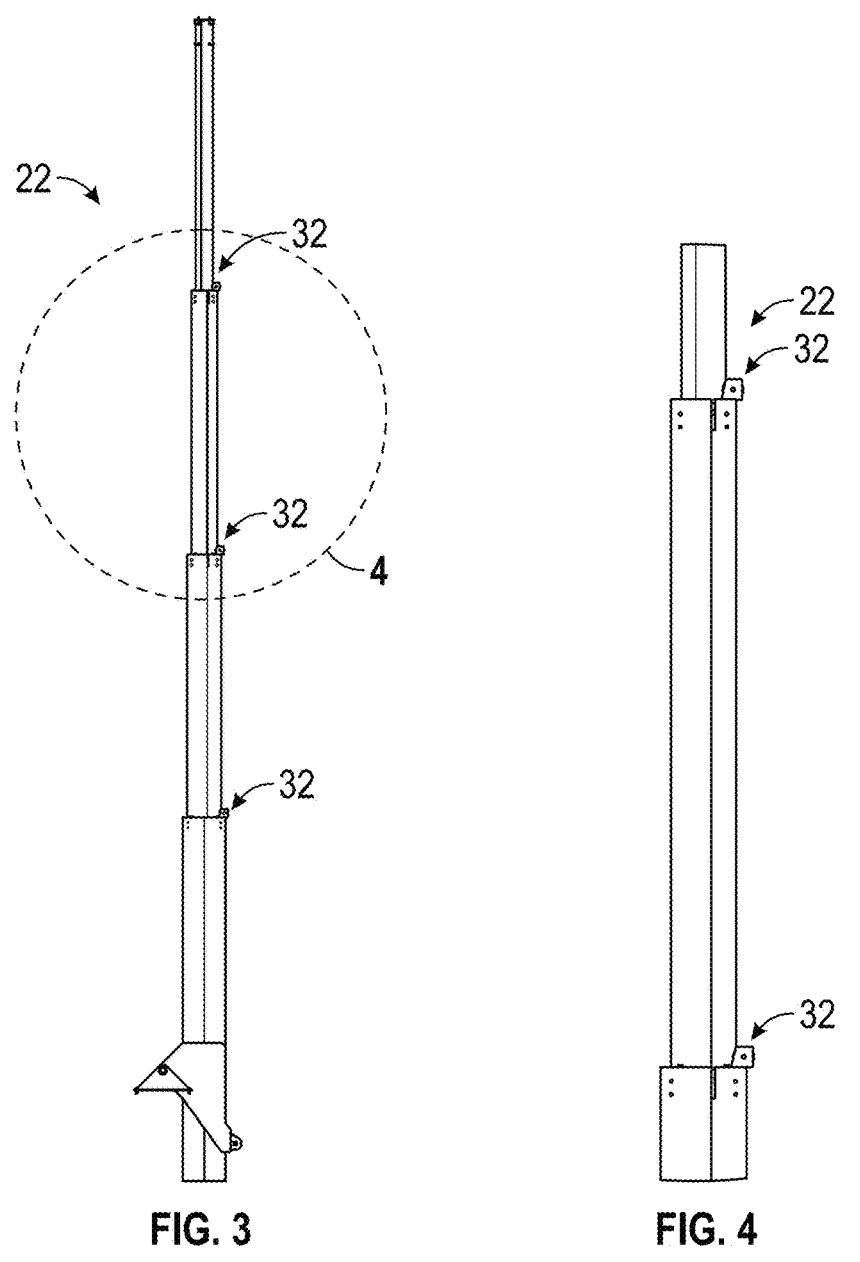
FIG. 3                    FIG. 4

WIND TURBINE ASSEMBLIES AND DEPLOYMENT METHODS

FIELD OF THE DISCLOSURE

The following disclosure relates to wind turbine assemblies and methods of deploying wind turbine assemblies.

BACKGROUND

Conventional wind energy systems cannot produce power everywhere it is needed because they are difficult to transport and install. This is because they are too large and/or heavy to transport to remote areas and require highly skilled technicians for installation. Many remote areas are not connected to a utility grid, such as indigenous communities, disaster relief areas, and military operation zones. There is a need for a portable wind energy system that can be easily transported to and installed in remote regions not connected to a power grid, and/or by consumers who want to use renewable energy, reduce and stabilize electric costs. In particular, there is a need for a portable, hydraulically self-erecting wind energy system that does not need cranes for deployment, does not require specialized skills to erect, needs minimal assembly, eliminates slab, and eliminates the need for transmission lines.

SUMMARY

The present disclosure, in its many embodiments, allevi-ates to a great extent the disadvantages of known wind energy systems by providing wind turbine assemblies with a number of innovative designs and features that greatly improve portability and ease of deployment. Disclosed wind turbine assemblies and related deployment methods include a telescoping mast with a plurality of mast sections and a hydraulic ram assembly to rotate the telescoping mast from a stowed horizontal position to a vertical, operational, posi-tion. The telescoping mast features an innovative over/under roller scheme to ease deployment. Disclosed carriage assem-blies, outrigger assemblies, and suspension and towing systems make the wind turbine more easily portable so it can be transported to the site of energy production.

Exemplary embodiments of a wind turbine assembly comprise a telescoping mast, an energy conversion system, and a carriage assembly. The telescoping mast has a top and a bottom, a mast roller system, and a plurality of mast sections. At least one of the mast sections is an internal mast section, and at least one of the mast sections is an external mast section. The energy conversion system is mounted to the top of the telescoping mast and includes a steering system, a wind instrument mast, a drive assembly, a rotor hub, a disc brake, and a plurality of blades extending from the rotor hub. The carriage assembly supports the telescop-ing mast. The mast roller system enables the internal mast sections to be pulled out from the external mast section, thereby facilitating extension of the telescoping mast.

In exemplary embodiments, a hydraulic ram assembly is provided to rotate the telescoping mast to a vertical position. The hydraulic ram assembly may comprise a lock-out valve preventing pressure loss. In exemplary embodiments, the wind turbine assembly further comprises an outrigger assembly connected to the carriage assembly, a suspension system supporting the carriage assembly, and a towing assembly connected to the suspension system. The mast roller system may include a plurality of inner wheels mounted on one or more roller axles. The plurality of mast sections may comprise four mast sections, and the plurality of blades may comprise five blades.

An exemplary embodiment of a wind turbine assembly comprises a telescoping mast, an energy conversion system, a carriage assembly, and an outrigger assembly. The tele-scoping mast has a top and a bottom, a mast roller system, and a plurality of mast sections. At least one of the mast sections is an internal mast section and at least one of the mast sections is an external mast section. The energy con-version system is mounted to the top of the telescoping mast. The carriage assembly supports the telescoping mast, and the outrigger assembly includes at least one control arm and at least one gate lock. The mast roller system enables one or more internal mast sections to be pulled out from the at least one external mast section, thereby facilitating extension of the telescoping mast. The control arms can fold the outrigger assembly parallel to the carriage assembly, and the gate lock locks the outrigger assembly to the carriage assembly.

In exemplary embodiments, the telescoping mast has a retracted position in which the mast sections are contained within each other and an extended position in which the mast sections are pulled out. When the telescoping mast is in the retracted position the telescoping mast fits in a 20-foot shipping container. When the telescoping mast is in the extended position the telescoping mast extends to a length of about 50 feet. The wind turbine assembly may also comprise a suspension system supporting the carriage assembly and a towing assembly connected to the suspension system.

Exemplary methods of deploying a wind turbine assembly are provided comprising unfolding at least one outrigger of an outrigger assembly, pulling out at least one internal mast section from at least one external mast section of a tele-scoping mast, installing a nacelle with its energy conversion system attached, and raising the telescoping mast from a horizontal position to a vertical position. Exemplary meth-ods also include drawing the at least one internal mast section tight such that the telescoping mast stays in an extended position. The telescoping mast has a top and a bottom, and the energy conversion system is installed at or near the top of the telescoping mast. The outrigger is unfolded. Installing the energy conversion system includes installing each of a plurality of blades into a rotor hub.

The unfolding step may include unlocking a gate lock to separate at least one outrigger from the carriage assembly and securing a control arm to stabilize the outrigger. The pulling out step may include removing turnbuckles and pulling at least one internal mast section until each of a plurality of studs pokes through a corresponding hole. Exemplary methods further comprise turning on a control panel to control the wind turbine assembly and applying a disc brake/parking brake. The methods may comprise enabling tracking of a rotor comprising the rotor hub and the blades. Exemplary methods further comprise releasing the disc brake/parking brake to allow the rotor to spin.

Thus, an exemplary wind energy system can be shipped in a single, relatively small (20-foot) shipping container and upon arrival at the shipping port can be towed to its use site on unimproved roads with a standard medium duty vehicle. Once on site at the desired operational location, outriggers are deployed from the trailer, blades (typically five) are snapped into place, i.e., inserted into the hub and secured, and the tower or mast is hydraulically raised. Within a very short period of time, even just a couple of hours, one or two workers with average skills can have the wind turbine assembled, deployed, and generating power. If conditions warrant a relocation of the wind energy system, it can be moved with the same relative ease. The portability and ease of transport to distributed generation sites eliminates some or all of the expenses associated with wind study, land acquisition, permitting, siting, site preparation, transportation, erection, environmental compliance, transmission lines, O&M, and power purchase agreements with local utilities.

The devices, systems, and methods of the disclosure advantageously provide small wind turbines in the 10-100 kW range that are economically viable and can produce power in remote or off-grid areas where it is needed. These wind turbines fulfill the need for meaningful, portable, renewable energy systems and mitigate or eliminate the above-mentioned constraints that prevent conventional wind turbines from achieving optimal efficiency. For instance, disclosed wind turbine assemblies and methods improve low wind speed energy capture and improve wind gust energy capture.

Disclosed embodiments can be used in conjunction with wind energy machines and systems as described and/or claimed in U.S. Pat. No. 9,353,730, issue May 21, 2016, which is hereby incorporated by reference herein in its entirety.

Accordingly, it is seen that wind turbine assemblies and methods of deploying wind turbine assemblies are provided. These and other features and advantages will be appreciated from review of the following detailed description, along with the accompanying figures in which like reference numbers refer to like parts throughout.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 2 is a detail side view of an exemplary embodiment of a mast roller system in accordance with the present disclosure;

FIG. 3 is a side view of an exemplary embodiment of a mast roller system in a fully extended position in accordance with the present disclosure;

FIG. 4 is a side view of an exemplary embodiment of a mast roller system in a retracted position in accordance with the present disclosure;

4

Figure 8:
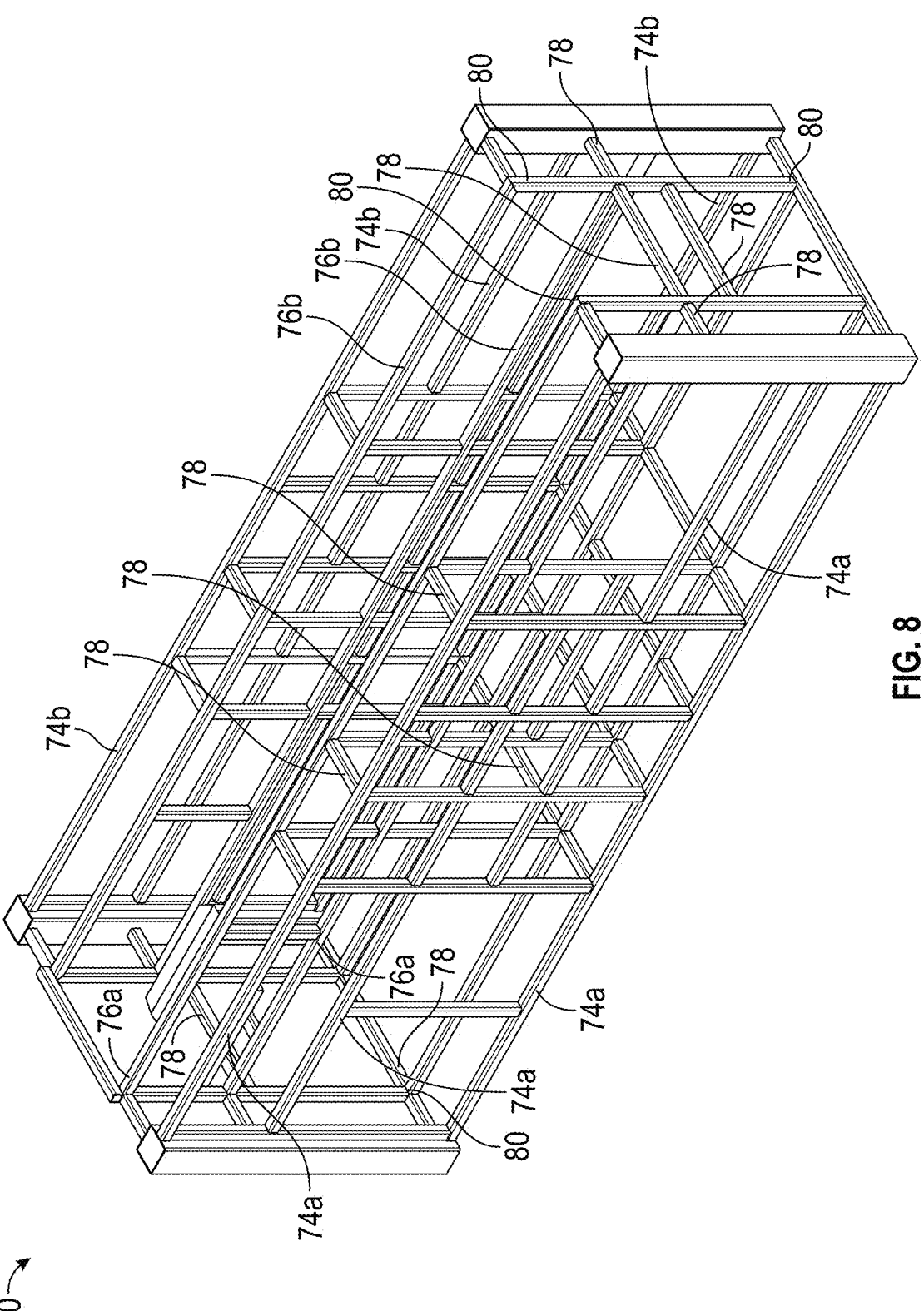
Figure 9A:
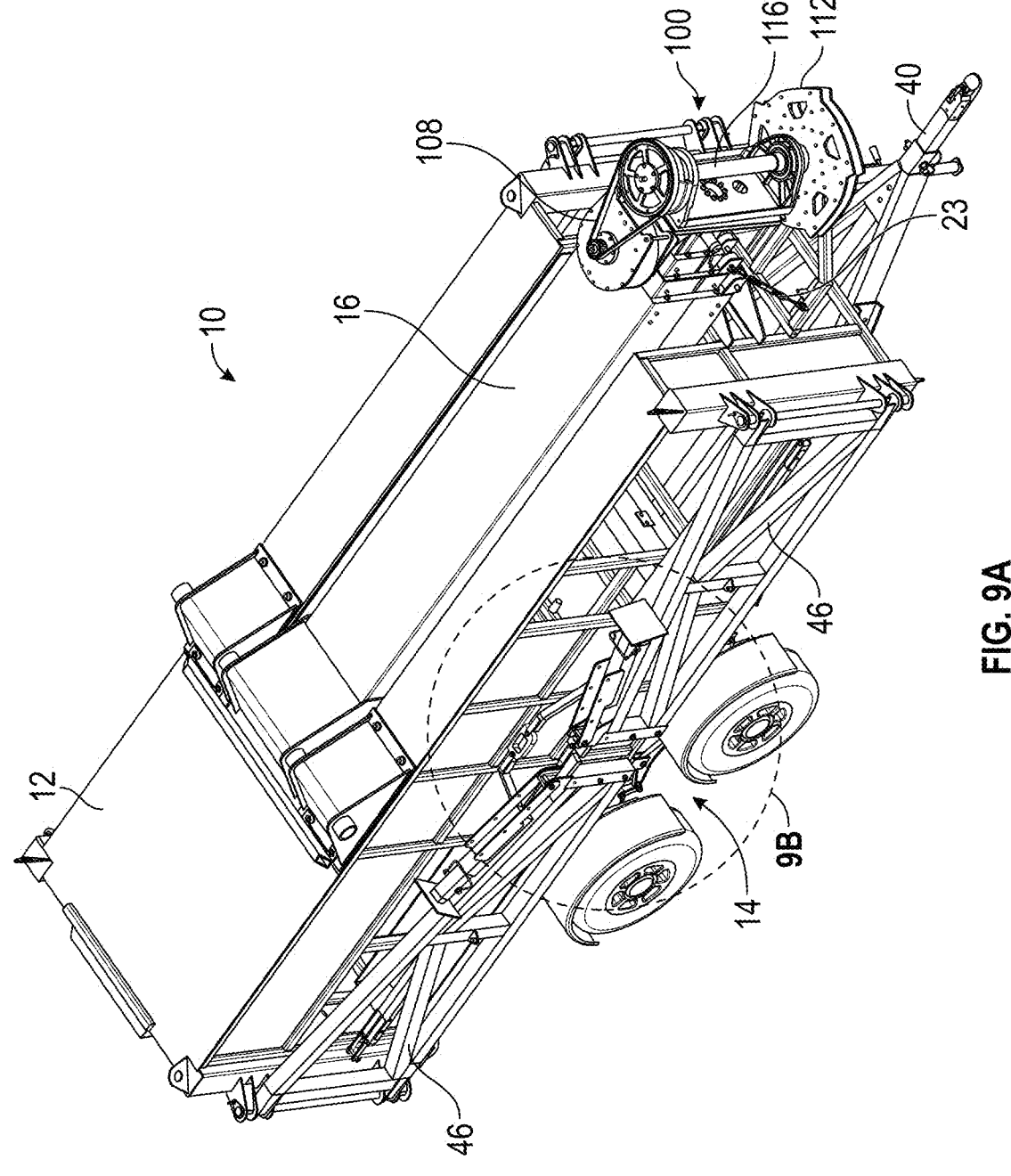
Figure 9B:
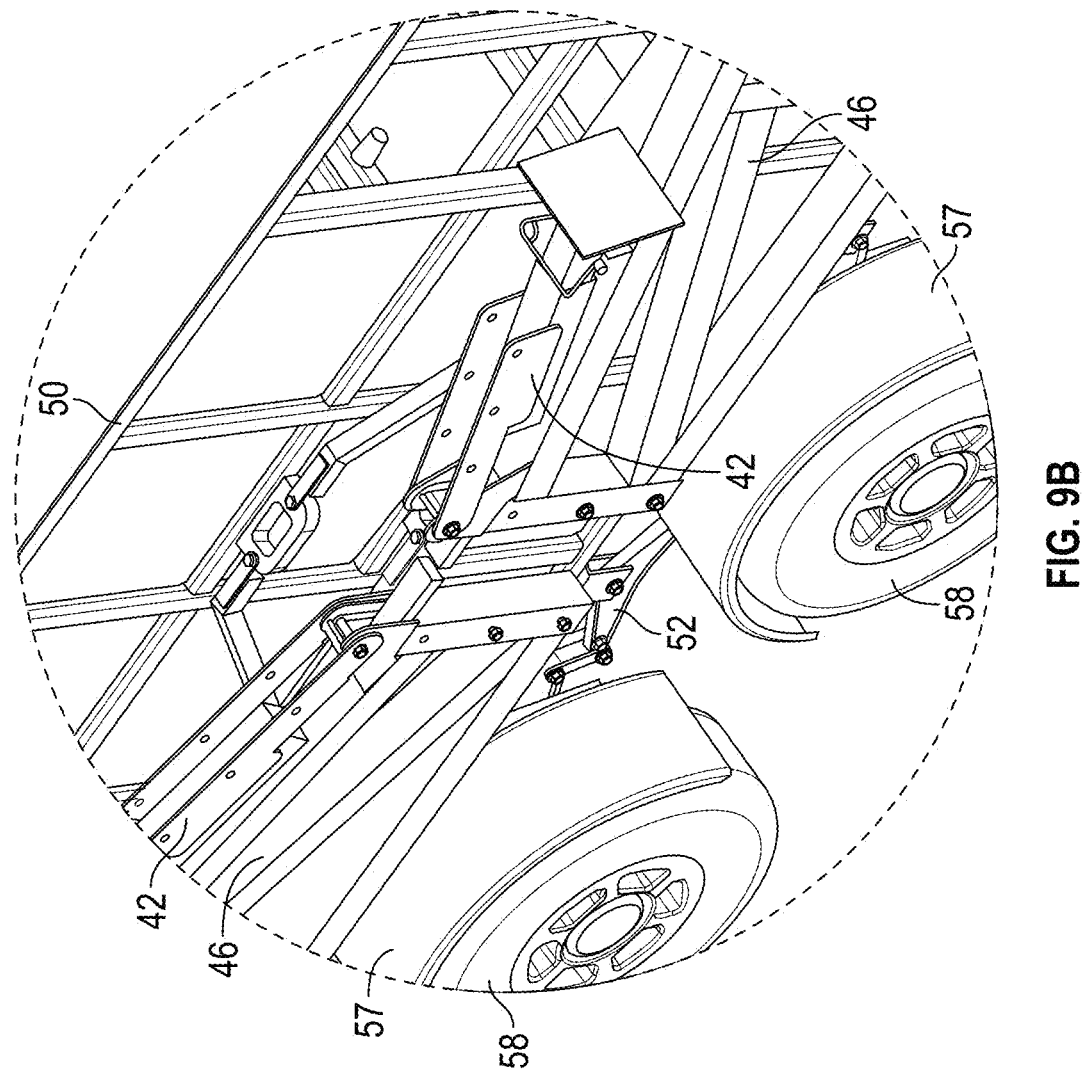
Figure 10A:
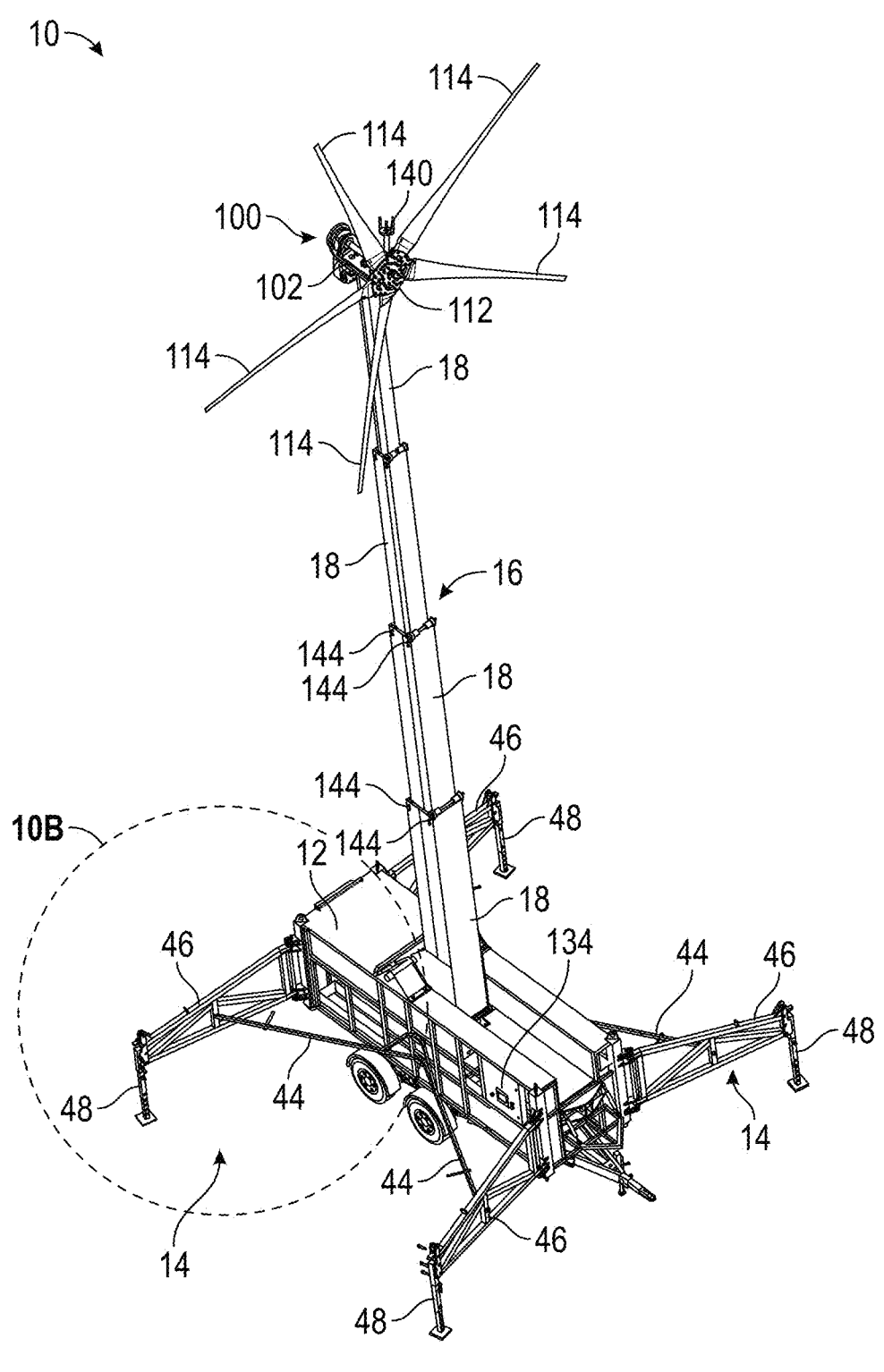
Figure 10B:
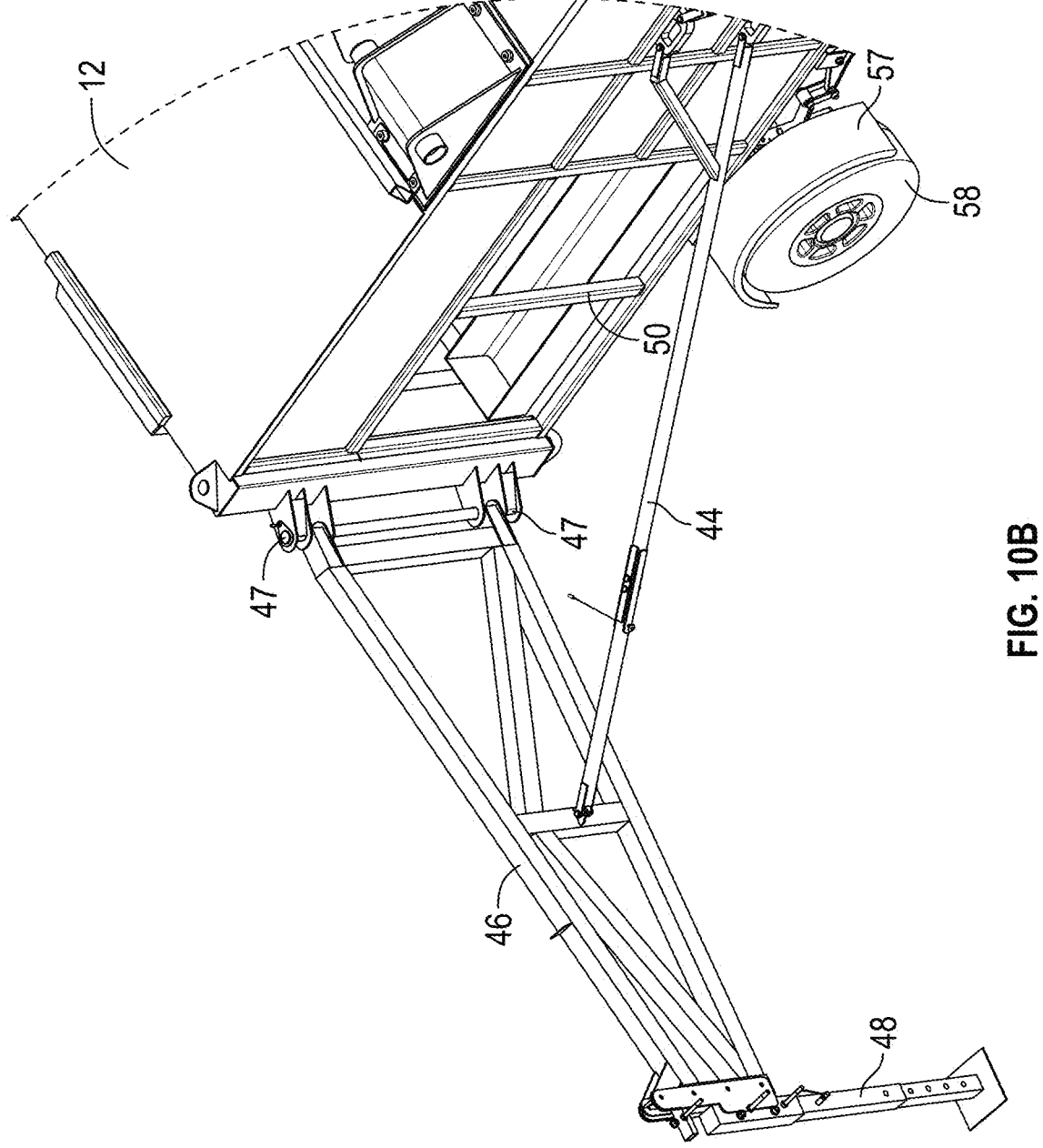
Figure 11A:
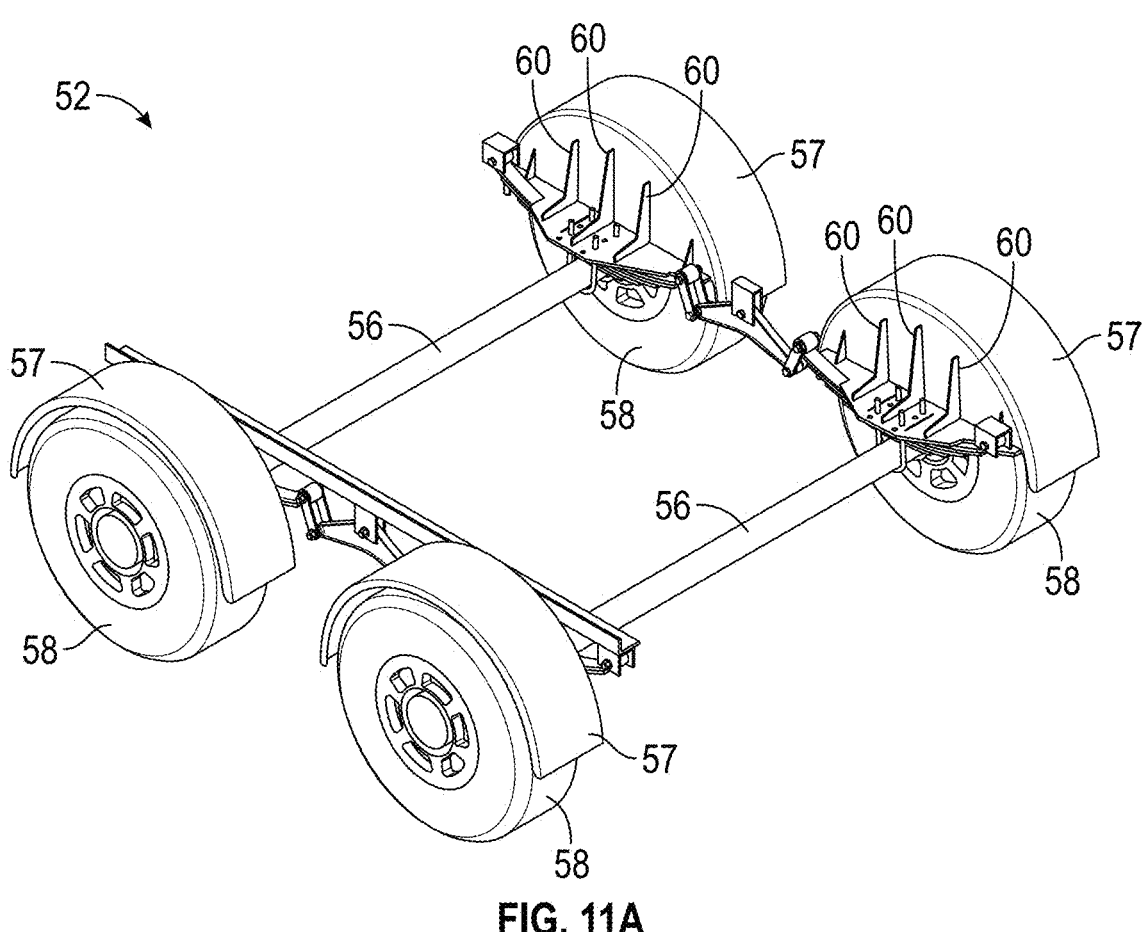
Figure 11B:
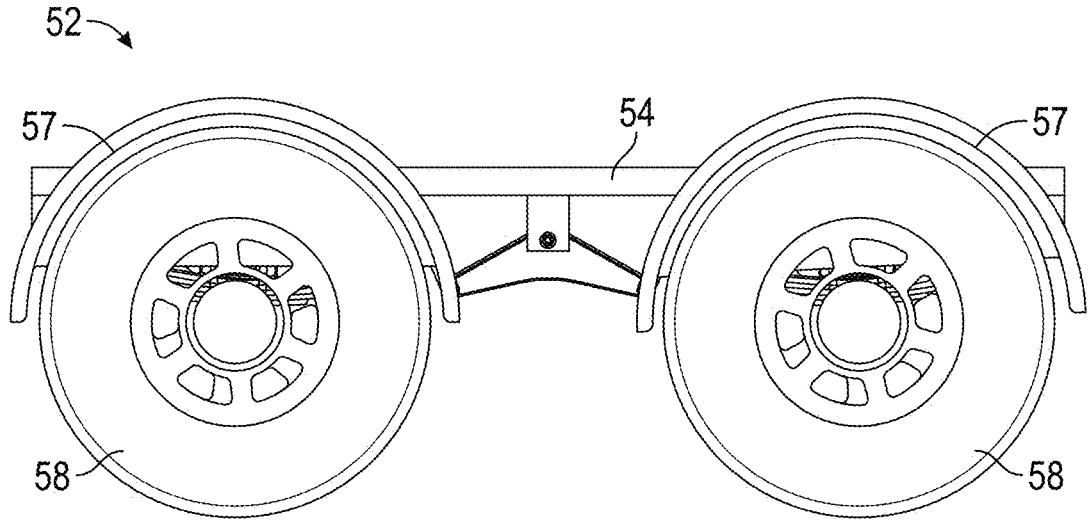
Figure 11C:
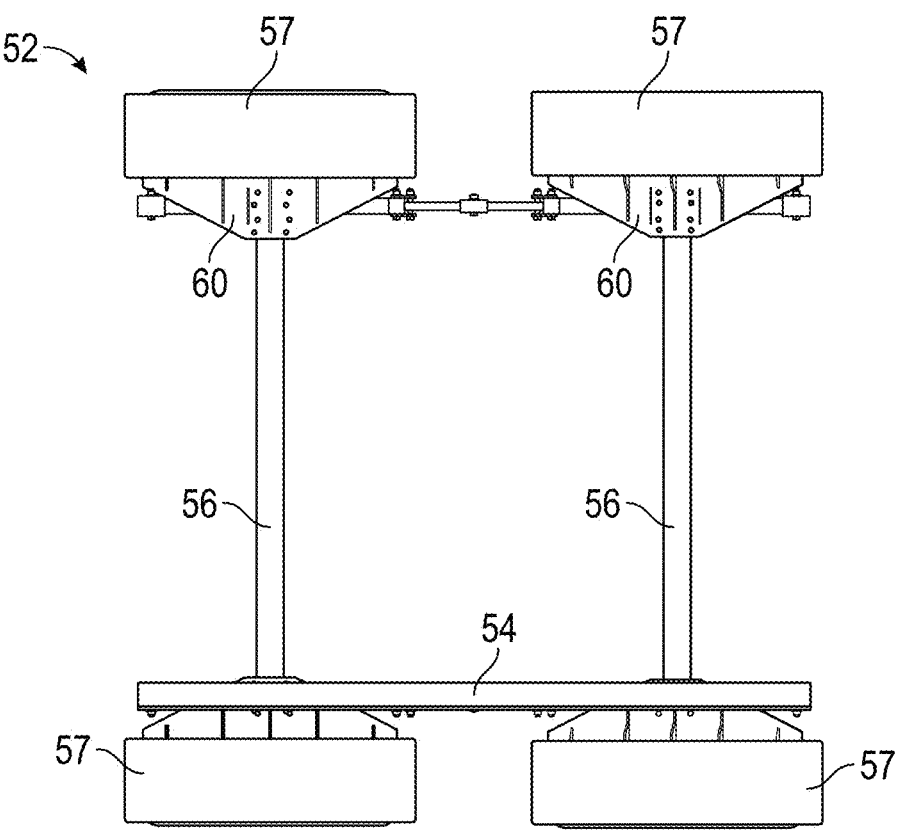
Figure 11D:
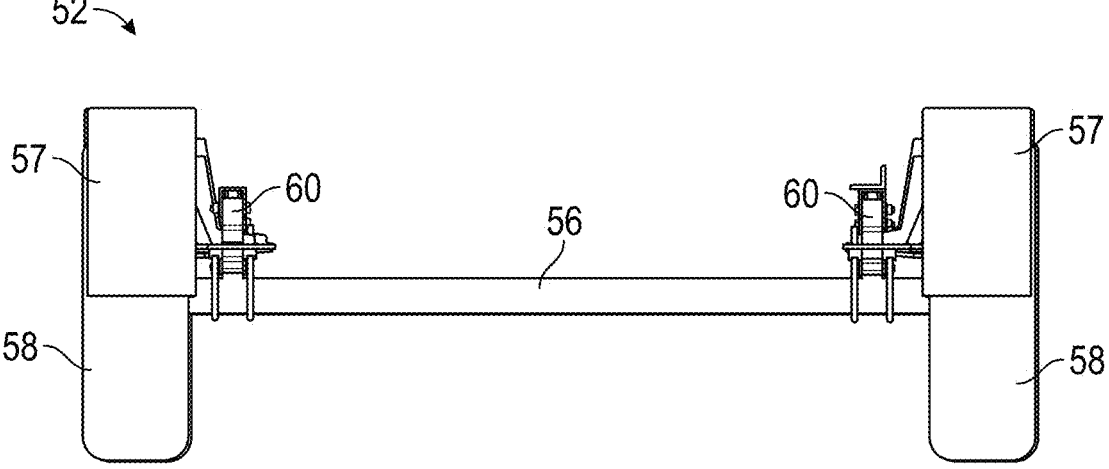
Figures 12A, 12B:
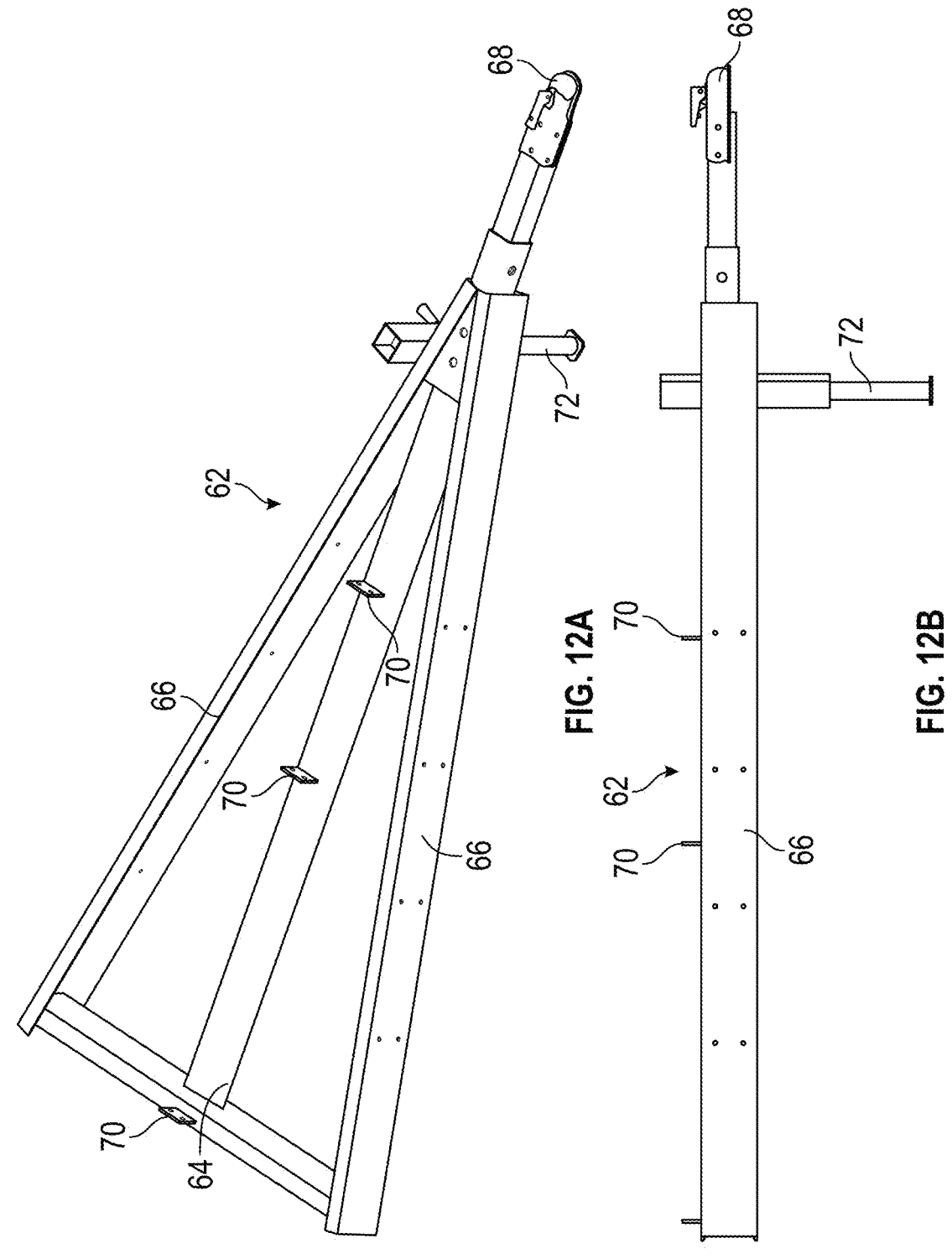
Figure 12C:
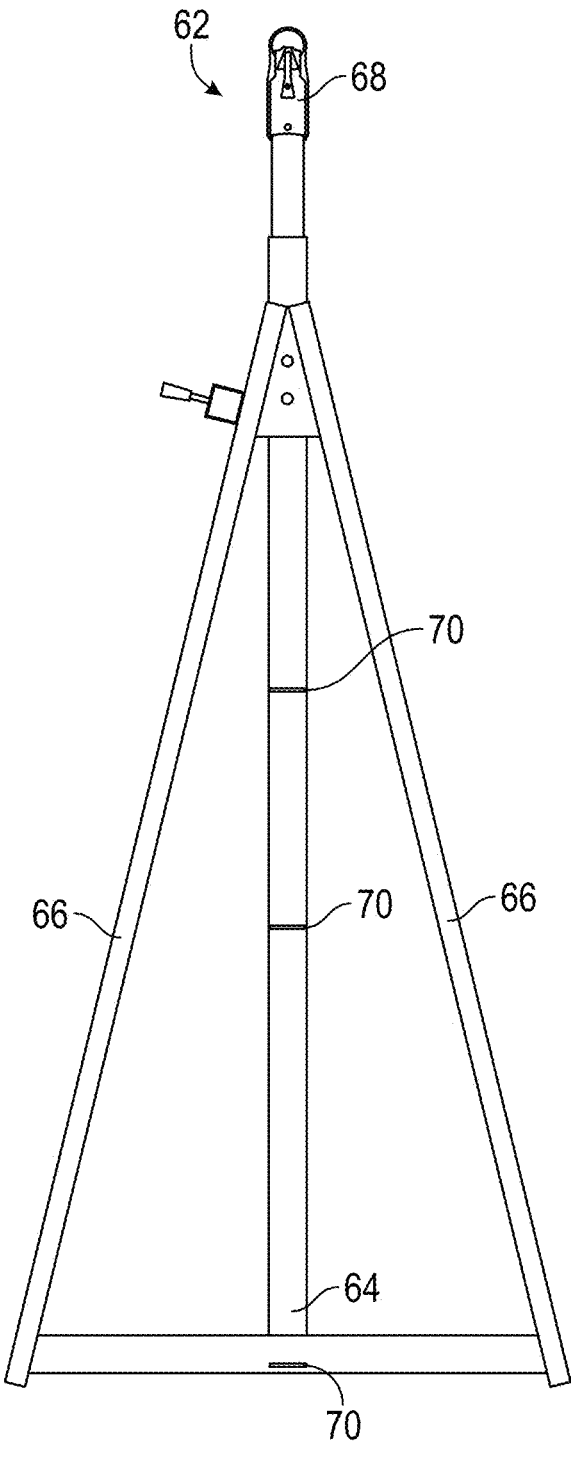
Figure 13:
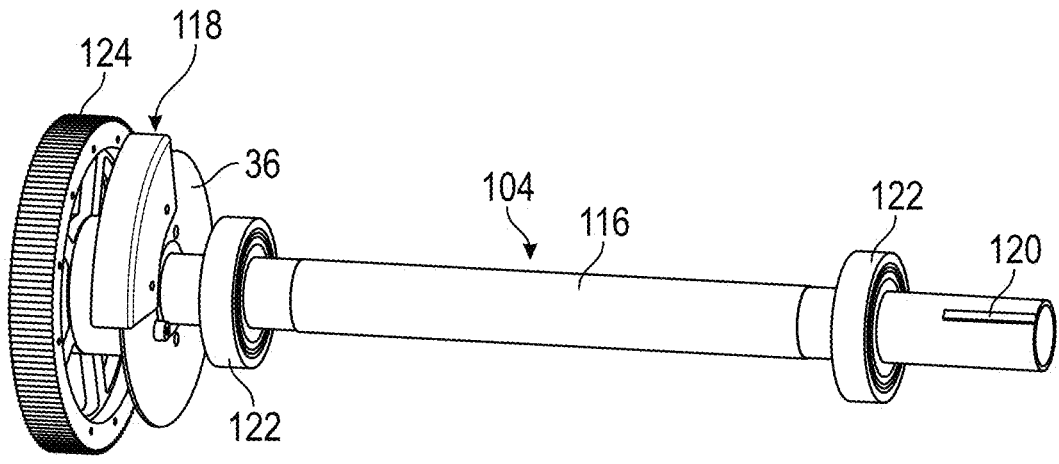
Figure 14:
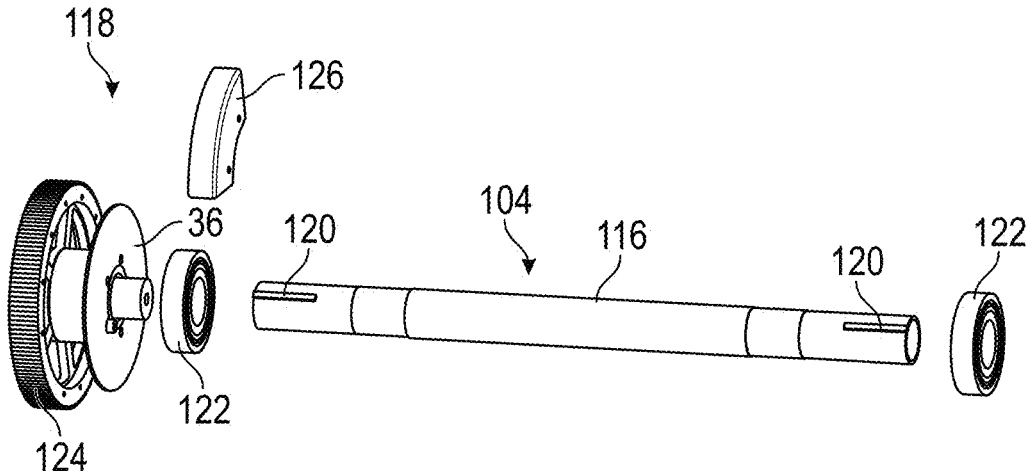
Figure 15:
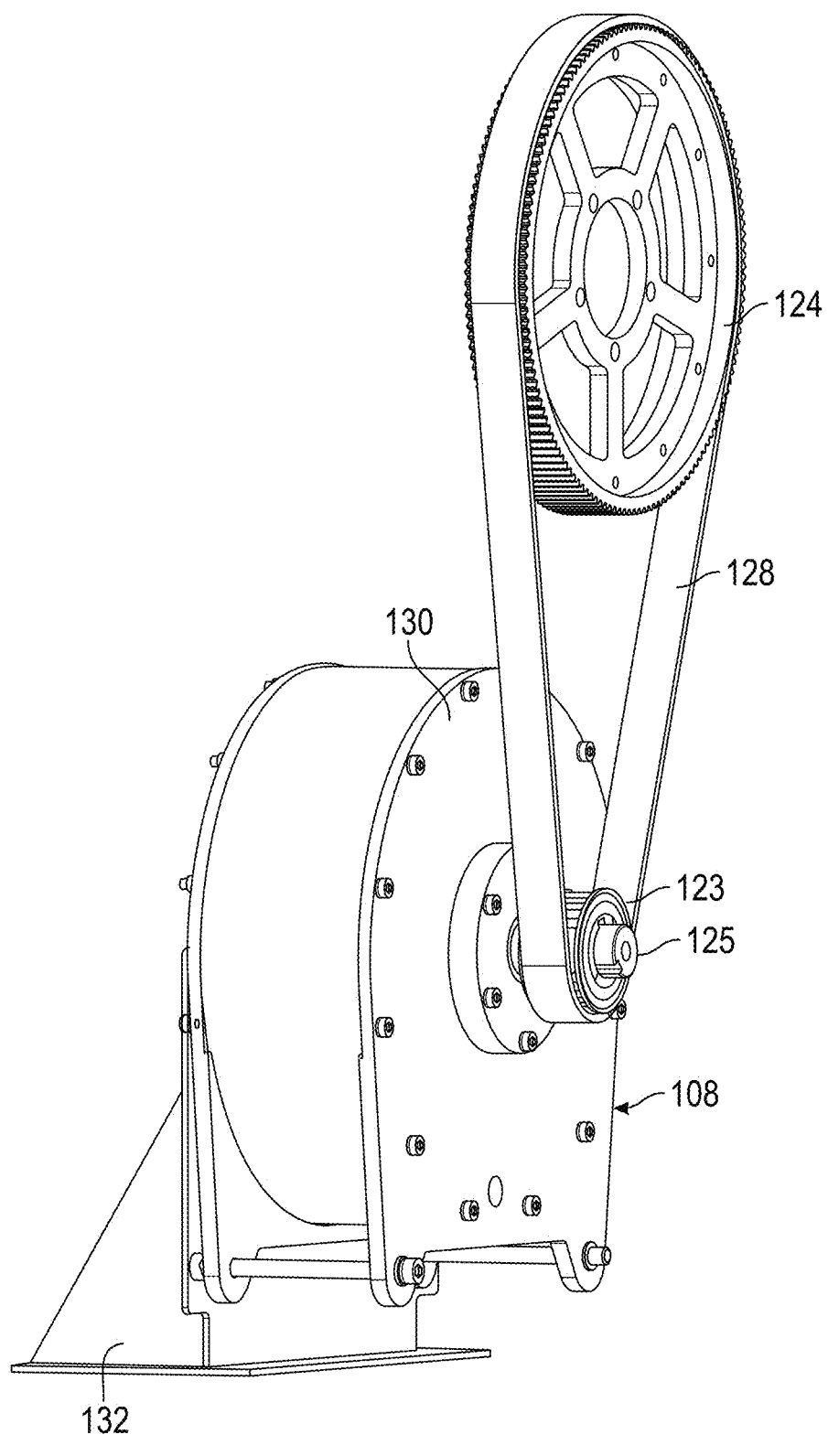
Figure 16:
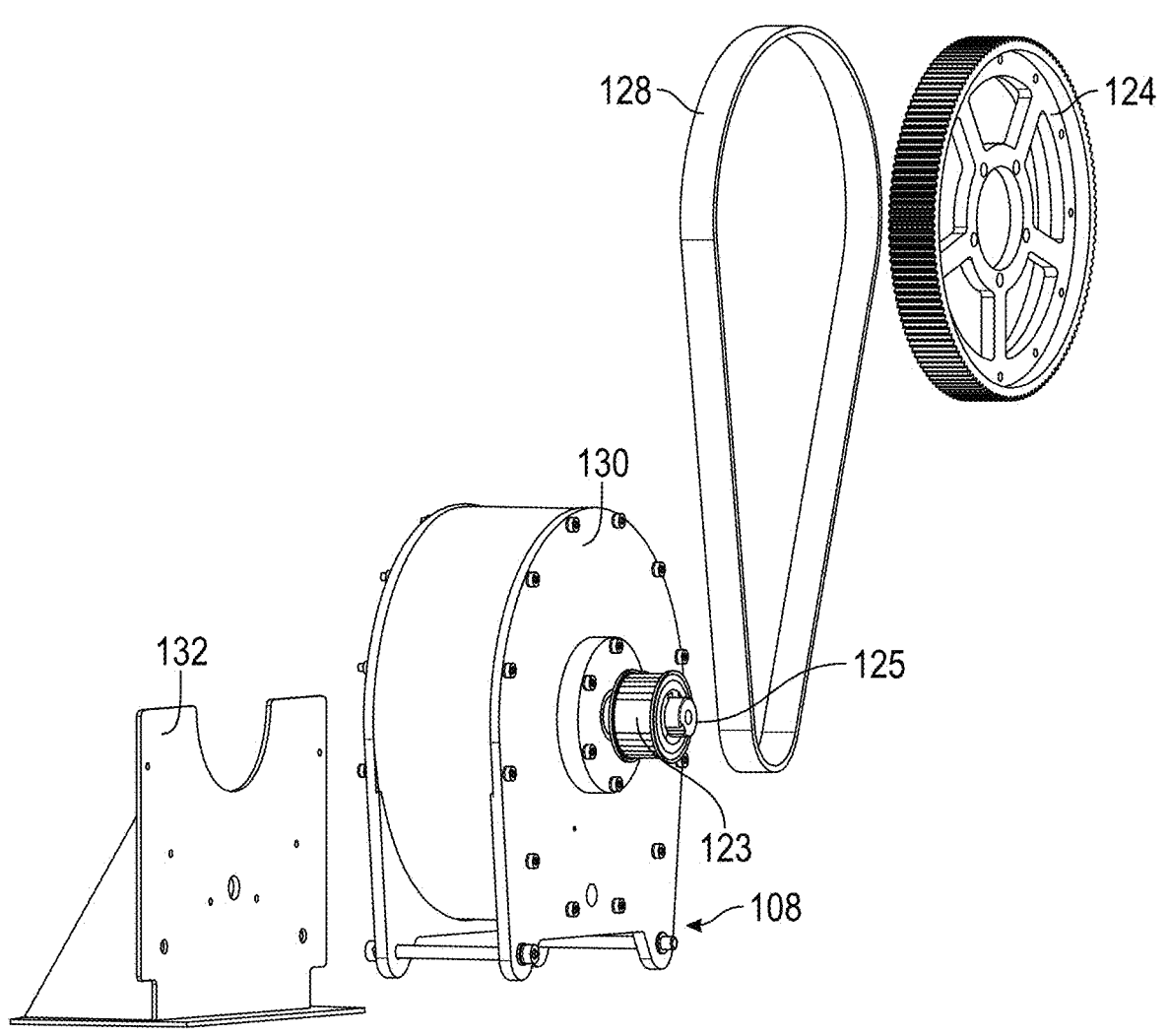
Figure 17:
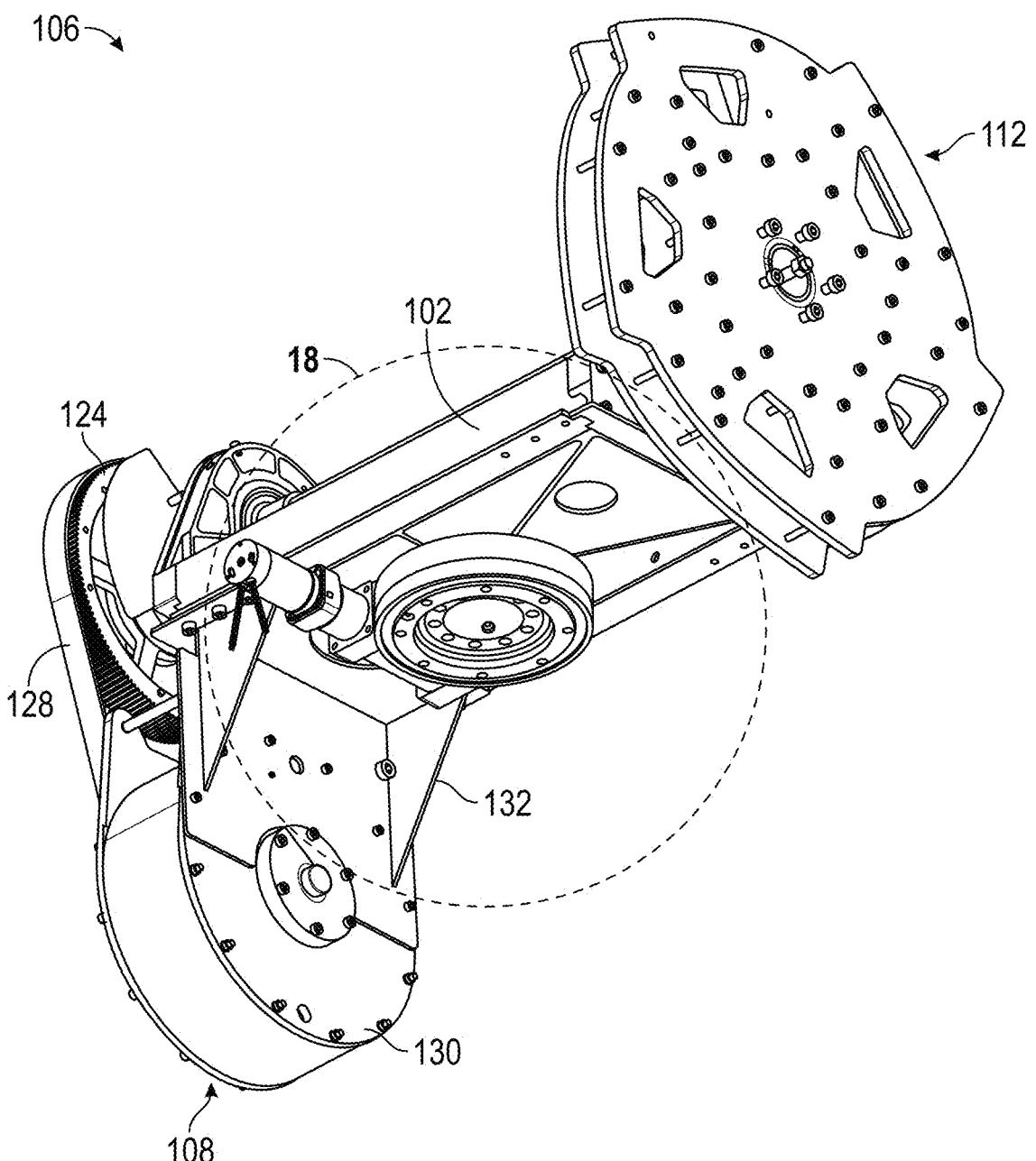
Figure 18:
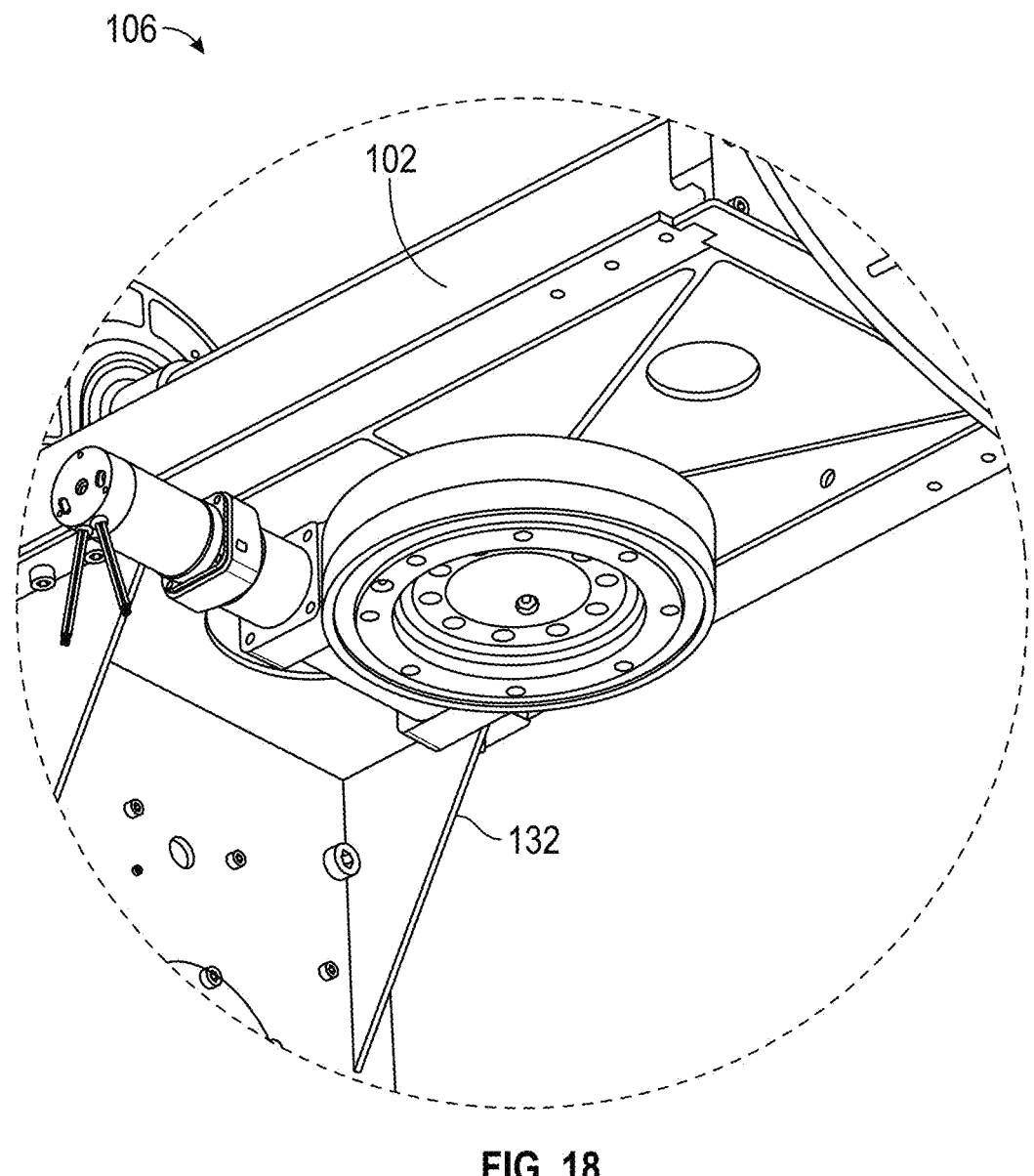
Figure 19:
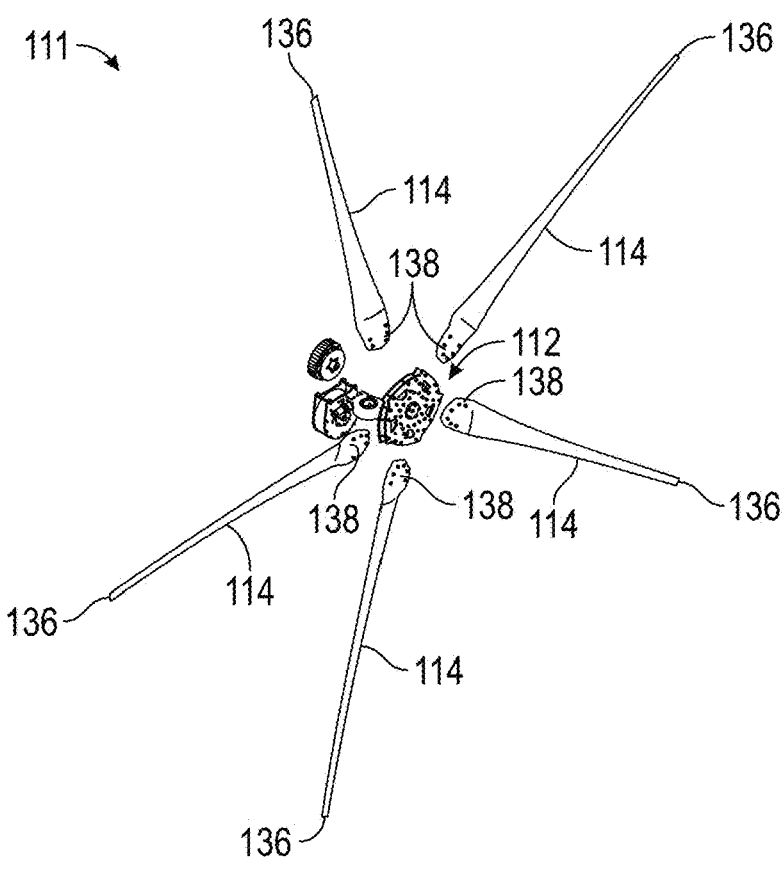
Figure 20:
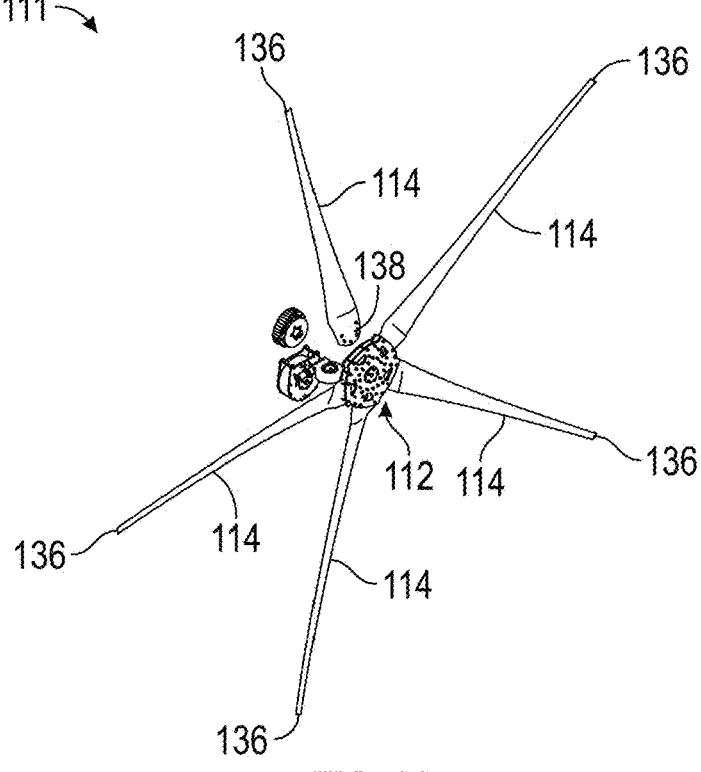

FIG. 8 is a perspective view of an exemplary embodiment of a frame design for a carriage assembly in accordance with the present disclosure;

FIG. 9A is a perspective view of an exemplary embodiment of a wind turbine assembly showing an exemplary outrigger assembly in a folded position in accordance with the present disclosure;

FIG. 9B is a detail view of an exemplary embodiment of an outrigger assembly in a folded position in accordance with the present disclosure;

FIG. 10A is a perspective view of an exemplary embodiment of a wind turbine assembly showing an exemplary outrigger assembly in an unfolded lifting position in accordance with the present disclosure;

FIG. 10B is a detail view of an exemplary embodiment of an outrigger assembly in an unfolded lifting position in accordance with the present disclosure;

FIG. 11A is a perspective view of an exemplary embodiment of a suspension system in accordance with the present disclosure;

FIG. 11B is a side view of the suspension system of FIG. 11A;

FIG. 11C is a top view of the suspension system of FIG. 11A;

FIG. 11D is a front view of the suspension system of FIG. 11A;

FIG. 12A is a perspective view of an exemplary embodiment of a towing assembly in accordance with the present disclosure;

FIG. 12B is a side view of the towing assembly of FIG. 12A;

FIG. 12C is a top view of the towing assembly of FIG. 12A;

FIG. 13 is a perspective view of an exemplary embodiment of a drive assembly in accordance with the present disclosure;

FIG. 14 is an exploded view of the drive assembly of FIG. 13;

FIG. 15 is a perspective view of an exemplary embodiment of an alternator and sprocket assembly in accordance with the present disclosure;

FIG. 16 is an exploded view of the alternator and sprocket assembly of FIG. 15;

FIG. 17 is a perspective view of an exemplary embodiment of a steering system in accordance with the present disclosure;

FIG. 18 is a detail view of the steering system of FIG. 17;

FIG. 19 is an exploded view of an exemplary embodiment of a rotor in accordance with the present disclosure; and FIG. 20 is a partially exploded view of the rotor of FIG. 19 with some of the blades installed.

DETAILED DESCRIPTION

In the following detailed description of embodiments of the disclosure, reference is made to the accompanying drawings in which like references indicate similar elements, and in which is shown by way of illustration specific embodiments in which disclosed systems, devices, and methods may be practiced. These embodiments are described in sufficient detail to enable those skilled in the art to practice the embodiments, and it is to be understood that other embodiments may be utilized and that logical, mechanical, functional, and other changes may be made without departing from the scope of the present disclosure. The following detailed description is, therefore, not to be taken in a limiting sense, and the scope of the present disclosure is defined by the appended claims. As used in the present disclosure, the term "or" shall be understood to be defined as a logical disjunction and shall not indicate an exclusive disjunction.

FIGS. 1A-1E show an exemplary embodiment of a wind turbine assembly 10, which is portable and easily assembled and deployed. The wind turbine assembly 10 advantageously has portability features such as a carriage assembly 12, an outrigger assembly 14, and a telescoping mast 16. An exemplary telescoping mast 16 is comprised of four mast sections 18, but could have two, three, five, or more mast sections, including one or more internal mast sections 18a, 18b, 18c that can be slidably disposed or inserted into each other and into an external mast section 18d during transport. As discussed in more detail herein, the external mast section 18d forms the base of the telescoping mast 16 when the mast is fully extended and deployed. The lower or external mast section 18d may be made of steel and be rotatable. It also may incorporate a pivot trunnion and tangs for the hydraulic ram assembly 20. When retracted and stowed, turnbuckles 23 secure the mast sections 18.

The size of the telescoping mast 16 and its sections can vary depending on the application, and in exemplary embodiments the base or external mast section 18d is about 12-18 feet long and about 1.4-1.8 feet square, and the internal mast sections 18a-18c are about 14-20 feet long and about 0.6-1.5 feet across. In exemplary embodiments, the telescoping mast 16 is hollow throughout to allow space for cables, hydraulic hose, control wires, and multiple mast sections 18 to retract and extend. Each mast section 18 may have a rain shield (not shown) to protect the telescoping mast 16 from rain and other inclement weather.

An exemplary telescoping mast 16 contains an over/under mast roller system 22, illustrated in FIGS. 2-6. When the telescoping mast 16 is in a horizontal position, the weight of the mast sections 18 and the nacelle deck and assembly (about 800 pounds) create a large downforce that increases rolling resistance over the nearly 40 feet of overhang. In exemplary embodiments, two turnbuckles provide restraint to prevent mast section 18b and 18c from moving in and out or up and down during shipping. The base mast section 18d may have two L-clips that secure it to mast section 18c. Advantageously, the judicious placement of rollers, i.e., about five feet of separation, allows the telescoping mast 16 to be extended and retracted without auxiliary supports and winches and without undue bending stresses or excessive rolling resistance. The mast roller system enables the internal mast sections 18a-18c to be pulled out from the external mast section 18d, thereby facilitating extension of the telescoping mast 16.

The mast roller system 22 has a plurality of inner wheels 24 mounted on one or more roller axles 26. The inner wheels 24 are at spaced locations along an all-mast gusset 26 extending through the entire length of the telescoping mast 16. Because they roll as they move, inner wheels 24 allow for the inner mast sections 18a-18c to be easily pulled out by hand. A mast cap plate 28 may be provided at the upper most end of the upper mast gusset 27, and a slewing azimuth gear drive unit separates the telescoping mast 16 from the nacelle 102 and all of the equipment attached to the nacelle 102. A pivot rod may be provided to move linkages of components as needed. A four-bolt and self-aligning lugnut feature 32 provides rigidity to the telescoping mast 16 in its fully extended position.

Figure 1A:
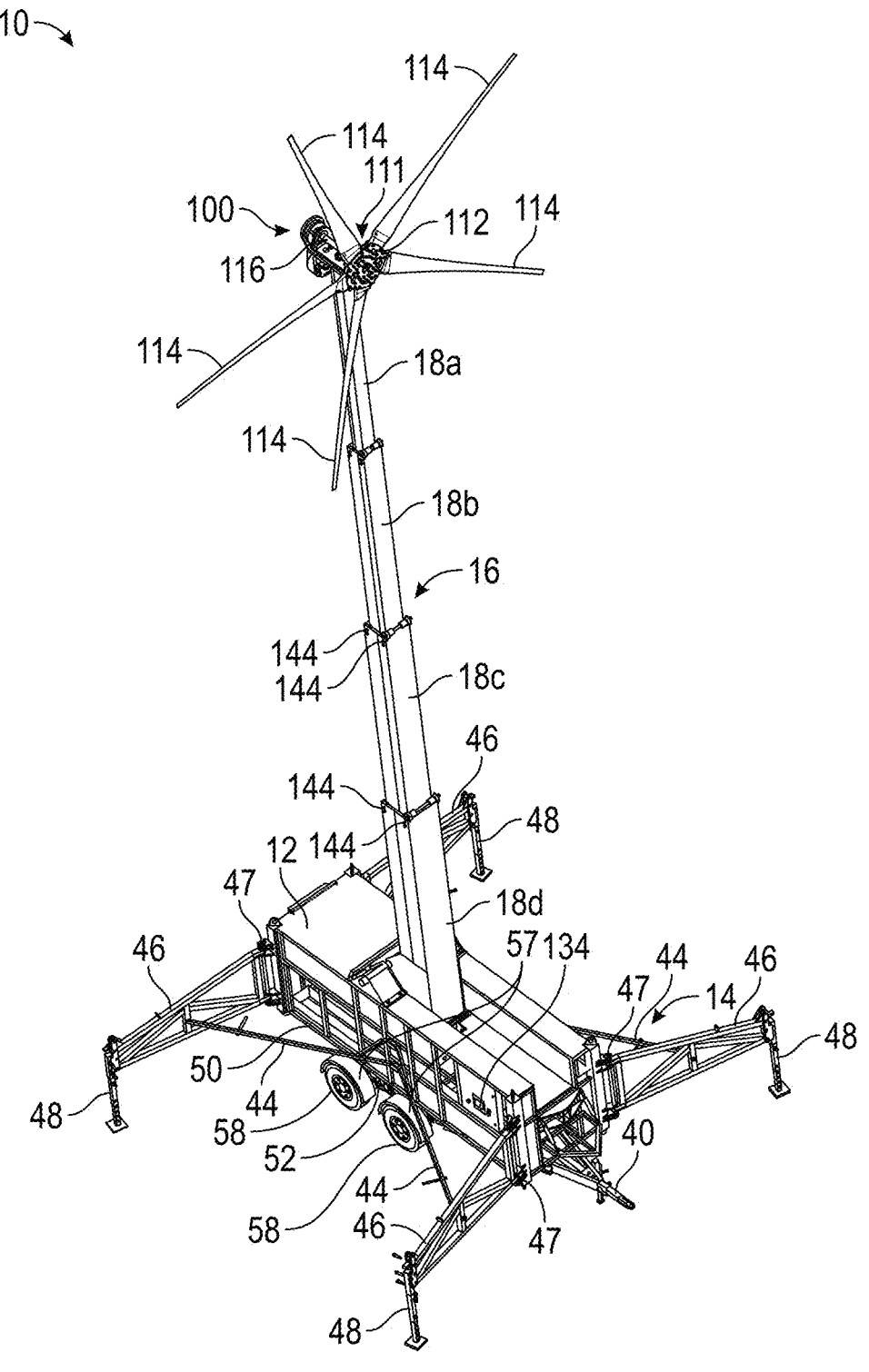
FIG. 1A is a perspective view of an exemplary embodiment of a wind turbine assembly in accordance with the present disclosure in a vertical, operational, position.
Figures 1B, 1C:
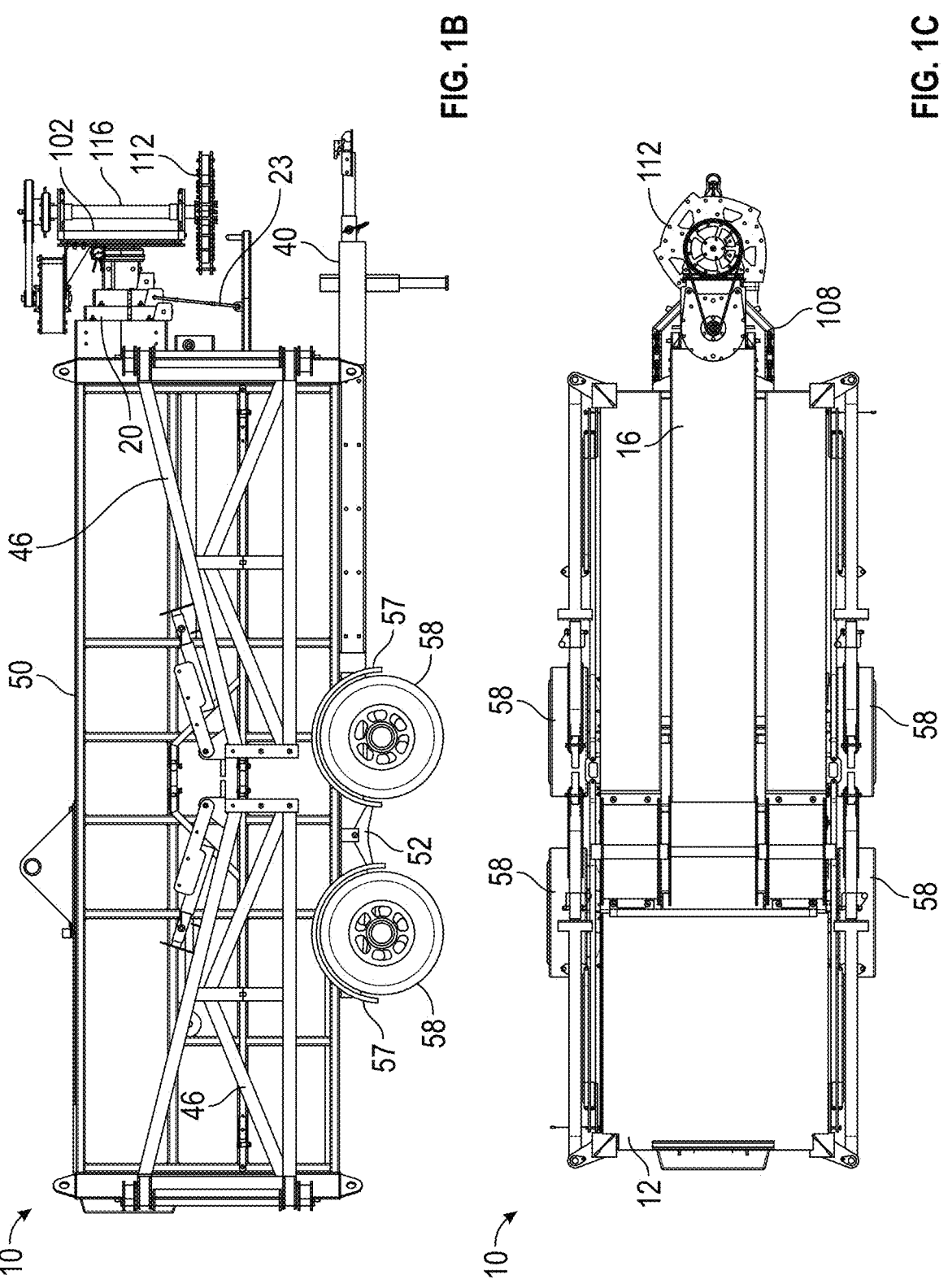
FIG. 1B is a side view of the wind turbine assembly of FIG. 1A in a retracted and stowed position.
FIG. 1C is a top view of the wind turbine assembly of FIG. 1A in a retracted and stowed position.
Figures 1D, 1E:
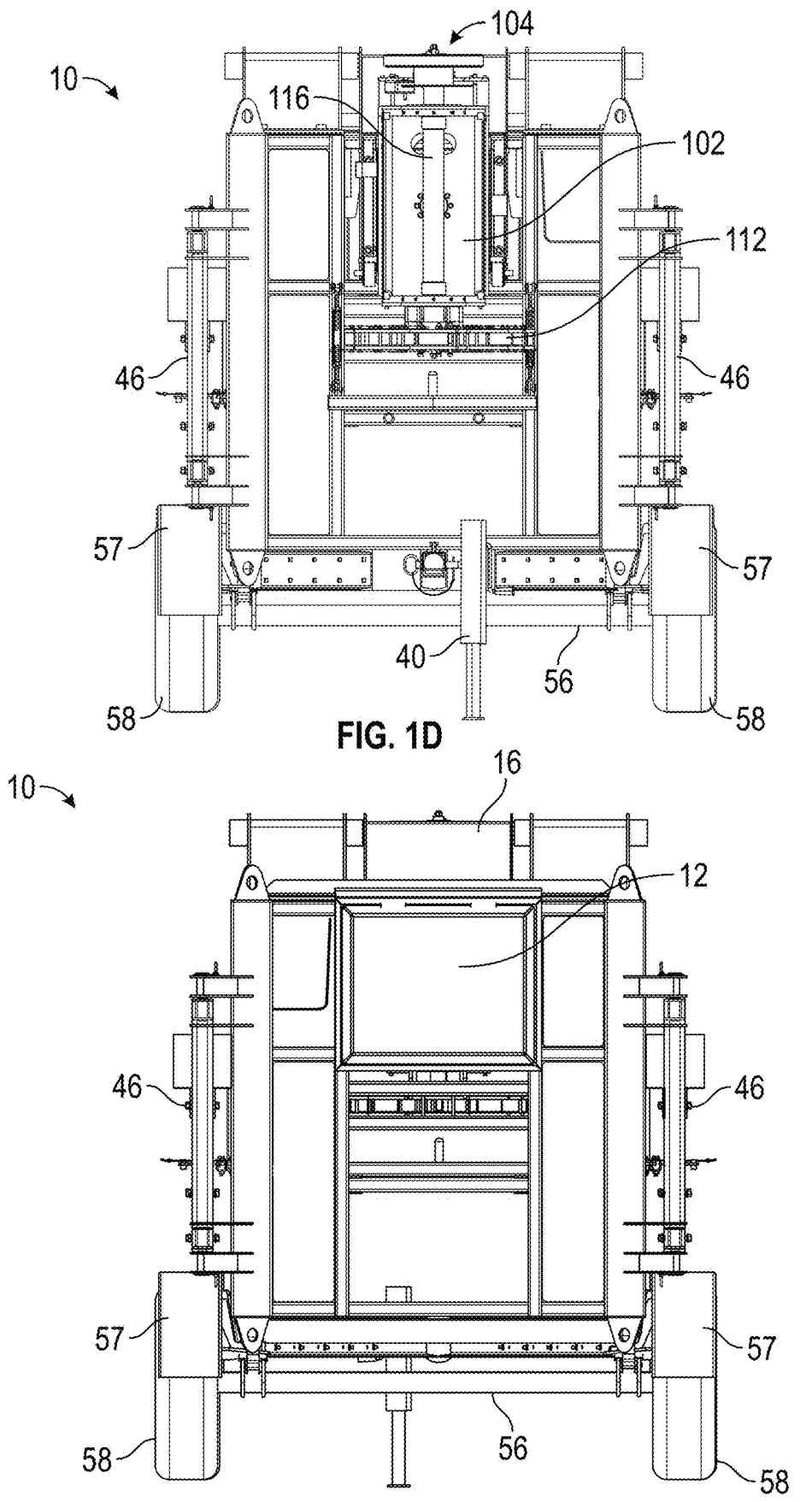
FIG. 1D is a front view of the wind turbine assembly of FIG. 1A in a retracted and stowed position.
FIG. 1E is a back view of the wind turbine assembly of FIG. 1A in a retracted and stowed position.
Figure 5:
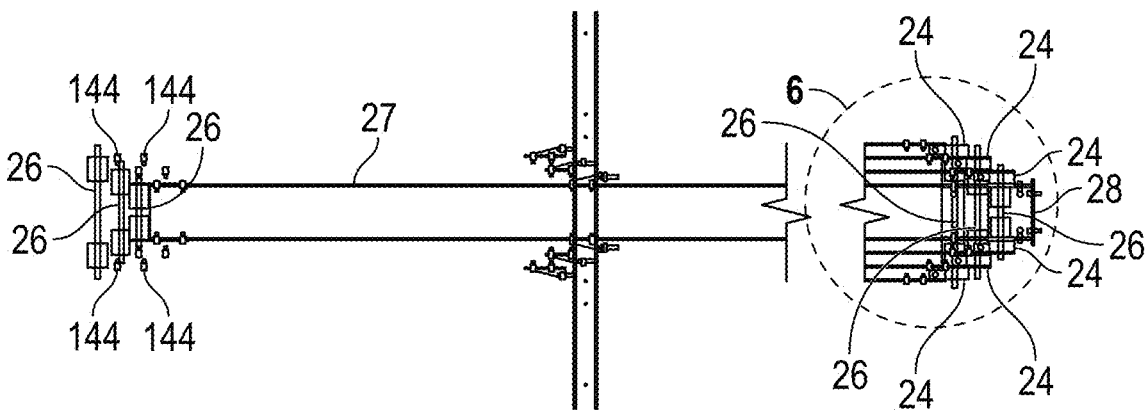
FIG. 5 is a detail interior view of an exemplary embodiment of a mast roller system in accordance with the present disclosure.
Figure 6:
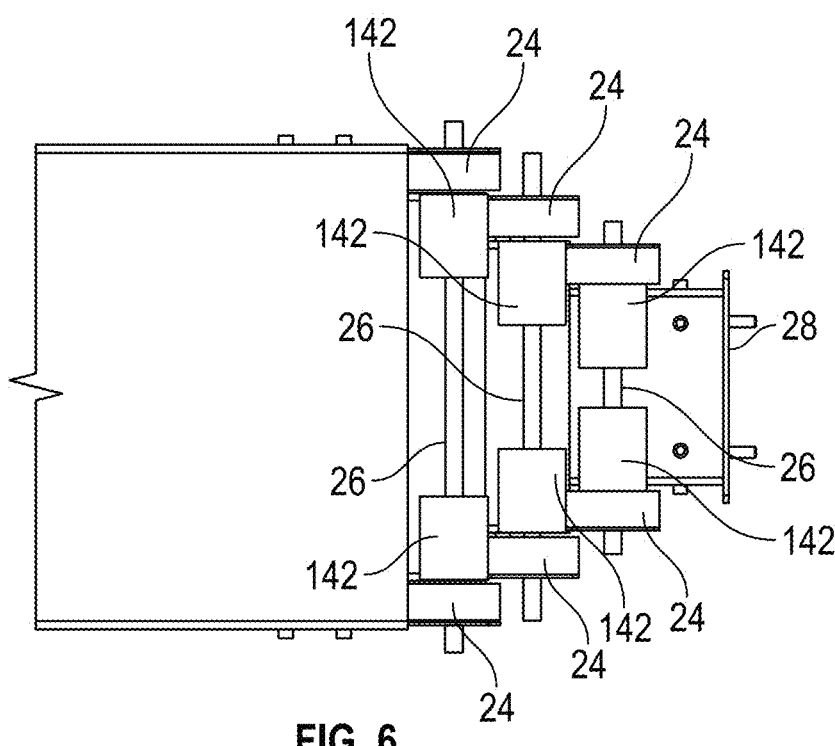
FIG. 6 is a detail interior view of the inner wheels and axles of an exemplary embodiment of a mast roller system in accordance with the present disclosure.
Figure 7:
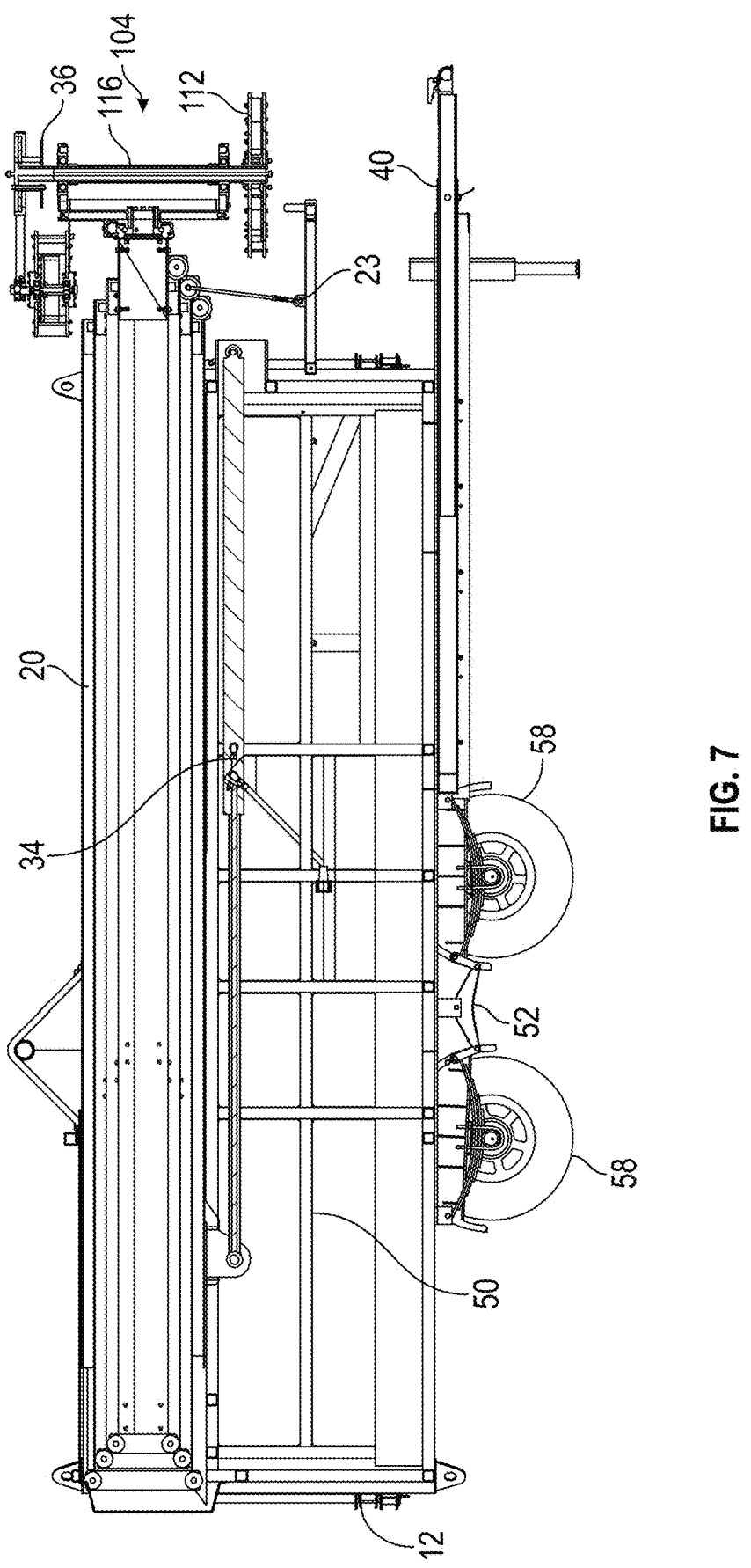
FIG. 7 is a side view of an exemplary embodiment of a hydraulic ram assembly in accordance with the present disclosure.

As shown in FIG. 7, wind turbine assembly 10 may include a hydraulic ram assembly 20 configured to lift the telescoping mast 16 from a horizontal position to a vertical position. The hydraulic ram assembly 20 has a lock-out valve 34, a safety feature that prevents pressure loss while the telescoping mast 16 is being lifted and deployed and thus prevents telescoping mast 16 from lowering itself. In exemplary embodiments, lock-out valve 34 is mounted directly to the steel ram. Fluid flow allowing the ram to retract and lower the telescoping mast 16 is restricted unless hydraulic pressure is applied to the lock-out valve 34 to allow flow. In exemplary embodiments, manual override is provided. The lock-out valve feature is critical because any loss of pressure during deployment could cause the telescoping mast 16 to lower itself uncontrolled. Advantageously, a guiding assembly is provided. In exemplary embodiments, the hydraulic ram assembly 20 is rated 4 HP DC 3000 psi and is 1.5" X 3" X 72".

Advantageously, the separate and dedicated hydraulic ram assembly 20 applies hydraulic pressure to a brake caliper 126 attached to the primary drive shaft 116 of the rotor 111 to prevent over-RPM and to secure rotor operation (shutdown). Hydraulic fluid may be stored in a high-pressure accumulator. In exemplary embodiments, the disc brake 36 has a fail-safe feature so that, in the event of an electrical power failure, where no power is available to apply the brake, upon the loss of power, the hydraulic fluid will automatically apply a braking force to the disc caliper 126 and stop rotation. Thus, disc brake 36 acts as a "parking brake." When power is restored, a motor will drive a hydraulic pump to recharge the accumulator.

The telescoping mast 16 stands on the carriage assembly 12 with its lower mast section 18d mounted to a trunnion that allows rotation from horizontal and vertical position and imparts a strong and stable connection from the mast section 18d to the carriage assembly 12. Carriage assembly 12 also provides strength to the outrigger assembly 14 and the hydraulic ram assembly 20. The carriage assembly 12 can be used for storage of other components of the wind turbine assembly 10 such as the suspension system 52 and towing assembly 40. In exemplary embodiments, the carriage assembly 12 includes one or more battery storage racks that can accommodate 20 to 200 kW/hr batteries. The wind turbine control box also may be located in the carriage assembly 12 in a shaded and weather protected location. The strength and support capabilities of the carriage assembly 12 are enhanced by its height of about 4-8 feet and its frame 50, which serves to center all load paths.

As best seen in FIG. 8, the frame design of the carriage assembly 12 is comprised of an innovative configuration of outboard tubes 74, interior tubes 76, and cross tubes 78. An exemplary frame design has a plurality of outboard right tubes 74a on one side of the frame 50 extending longitudinally from one end of the carriage assembly 12 to the other and a plurality of outboard left tubes 74b on the other side of the frame 50 also extending longitudinally parallel to outboard right tubes 74a. A series of interior tubes 76 are located inside of the outboard tubes 74, with interior right tubes 76a and interior left tube 76b extending longitudinally parallel to the outboard right tubes 74a and outboard left tubes 74b. Several cross tubes 78 extend latitudinally in the frame 50 running between and connecting the interior and outboard tubes, e.g., a cross tube 78 could connect an outboard right tube 74a to a corresponding interior right tube 76a; another cross tube 78 could connect an interior right tube 76a to a corresponding interior left tube 76b; another cross tube 78 could connect an interior left tube 76b to a corresponding outboard left tube 74b. Weldment assemblies 80 are used to provide secure connections between tubes.

Turning to FIGS. 9A-9B and 10A-10B, an exemplary outrigger assembly 14 will now be described. Outrigger assembly 14 is connected to the carriage assembly 12 and has gate locks 42, foldable control arms 44, and outriggers 46 attached to the carriage assembly by hinges 47. In exemplary embodiments, the outrigger assembly 14 has four control arms 44 and four outriggers 46, but a greater or lesser number of outriggers and control arms could be used depending on the application. Each outrigger 46 is attached to a corner of the carriage assembly 12 by one or more hinges 47, and a control arm 44 extends between each outrigger 46 and the frame 50 of the carriage assembly 12. Advantageously, the hinges 47 are aligned to transmit the stability loads to the exact center of the telescoping mast 16 when it is raised. An outrigger jack 48 is located at the end of each outrigger 46 for support, and each jack is stowed in place when the outriggers 46 are folded and rotate to lifting position when the outriggers are unfolded. As discussed in more detail herein, the control arms 44 serve to unfold the outriggers 46 and fold the outriggers parallel to the carriage assembly 12, and the gate lock 42 locks the outrigger assembly 14 to the carriage assembly 12. The control arms are made of a stiff, strong material such as rectangular steel tubing.

The carriage assembly 12, the telescoping mast 16, and most of the wind turbine assembly 10 are supported by a suspension system 52. An exemplary suspension system 52 is shown in FIGS. 11A-11D. The suspension system 52 is comprised of a side member 54 and at least two axles 56. Wheels 58 are attached to the axles 56 at both sides of each, and each wheel may have a wheel cover 57. Side member 54 is located one side of the axles 56, and supporting components 60 comprised of long-fitted angle iron are provided on the opposite side of the axles 56. These supporting components 60 can slide fore and aft to achieve the optimal tongue weight (depending on optional equipment and its effect on the longitudinal center of gravity) for towing purposes. Advantageously, the suspension system 52 is movable and repositionable.

With reference to FIGS. 12A-12C, exemplary embodiments include a towing assembly 62 that can be connected to the suspension system 52 so the stowed wind turbine assembly 10 can be hooked up to a truck or other vehicle for towing and transport. A towing assembly 62 could be in any configuration that provides sufficient strength to pull all the components of the wind turbine assembly 10. In exemplary embodiments, the towing assembly 62 is comprised of a T-shaped central tube 64 (which could be comprised of individual tubes connected to form a "T" or a unitary T-shaped member) and two C-channel frame members 66. Each C-channel frame member is connected to the top of the T at one end and configured at an acute angle so it extends to and connects to the bottom of the T at the other end, thus forming a triangle shaped assembly. A coupler 68 is located at the bottom end of the central tube 64 for hooking up to a truck or other vehicle. Flanges 70 are located at various points along the central tube 64 for managing the heavy tongue during loading and unloading, and a swivel side wind jack 72 is provided to support the towing assembly 62. Advantageously, the towing assembly 62 is removable and its length can be adjusted.

Turning now to FIGS. 13-20, exemplary embodiments of an energy conversion system 100 will now be described. The energy conversion system 100 is located at the top of the telescoping mast 16 and includes a nacelle 102 mounted to the top portion of the mast. The nacelle 102 houses various components of the wind turbine assembly 10, including drive assembly 104, steering system 106, and alternator 108. Nacelle 102 is a strong structure, which may be made of steel or other material of suitable strength, and supports the drive assembly 104 and rotor 111 and rotates with the rotor. The steering system 106 enables 360-degree rotation with limit switches and may include a 24-volt DC steering motor driving a slewing drive. The rotor hub 112 is attached to the nacelle 102, and several blades 114 extend from the rotor hub.

FIGS. 13 and 14 illustrate an exemplary drive assembly 104, which includes a drive shaft 116 with a sprocket subassembly 118. The drive shaft 116 may have a drive shaft key 120 at one or both ends for about four inches. A bearing 122 is slidably disposed onto each end of the drive shaft 116. The sprocket subassembly 118 includes sprocket 124 and a brake caliper 126 to house the drive assembly's brake pads (not shown). As best seen in FIG. 15, the sprocket 124 engages with the alternator belt 128, which rotates about a pulley 123 attached to the front bearing 125 of the alternator 108. The sprocket may be made of Gates carbon fiber, and the sprocket 124 and belt 128 may be a Gates carbon fiber polychain cog drive.

Alternator 108, shown in FIGS. 15 and 16, contains within its housing 130 a rotor and stator (not shown) and one or more permanent magnets (not shown). In exemplary embodiments, the alternator 108 is a 48-pole 3 phase AC permanent magnet alternator. An alternator bracket 132 may be provided to support the alternator. The rear end of the drive shaft 116 drives the sprocket 124 that drives the alternator 108 at a step-up ratio. A hydraulic disc brake may be fitted on the main drive shaft 116 to stop rotation and prevent damage to wind turbine assembly 10. The disc brake 36 is fail safe, i.e., in the event of a total loss of power, the brake applies and stops the rotor 111. The alternator 108 powers steering system 106, which aligns and re-aligns the rotor 111 azimuth angle based on wind direction. In exemplary embodiments, the alternator 108 has a maximum electrical load rating of 18 kW, which is enough to control the wind energy in all normal wind speed and blade torque ranges.

Turning to FIGS. 19 and 20, an exemplary embodiment of a rotor 111 will now be described. Advantageously, the energy capture efficiency of the rotor 111 is maximized by selection of optimum foil shape for each blade 114. An exemplary blade 114 has a foil shape that extends substantially the entire length of the blade 114. More particularly, the foil shape extends from the blade tip 136 to the blade root 138, optimizing blade shape along the entire length of the blade 114 even to the root end. In exemplary embodiments, the blades 114 are pressure formed with carbon fiber and vinyl-ester resins in two halves. In exemplary embodiments, they are bonded with a central spar using methacrylite adhesive, resulting in low weight blades that have exceptional stiffness. Each blade 114 is weight and center of gravity matched and coated with a UV linear polyurethane coating.

It should be noted that blade shape can be adjusted and different blades provided for different wind classes and swapped with seasonal wind strengths because each wind class benefits from a specific foil shape. In exemplary embodiments, the rotor 111 comprises five blades 114. This configuration increases low wind speed energy capture because it provides even greater blade surface area while reducing the diameter, or sweep, of the rotor 111 and maintaining the desired aspect ratio.

Rotor hub 112 holds the blades 114 and connects them to the drive assembly. The hub 112 also provides mounting for the blades 114. The rotor hub 112 is comprised of two equal plates, precision machined to align five blades equally with six holding bolts per blade. The root 138 of each blade 114 is inserted into the rotor hub 112 in the hollow center areas between the two plates of the rotor hub spaced apart from each other. In exemplary embodiments, the lower hub plate is fixed in place, and the upper hub plate is spring loaded to allow the blades to be inserted and the bolts inserted and tightened. Blade tip run-out and spacing is exact. When the telescoping mast 16 is in the horizonal position, rotor hub 112 also is horizontal.

In operation, transporting an exemplary embodiment of a wind turbine assembly 10 starts with loading all the components and systems into the carriage assembly 12. The telescoping mast 16 is loaded in a horizontal and fully retracted position with all internal mast sections 18a, 18b, 18c disposed within the external base section 18d, having an overall stowed length of about 20 feet. The outrigger assembly 14 is in its folded position parallel to the carriage assembly 12. The rotor 111, including rotor hub 112 and blades 114, as well as the complete nacelle 102 containing the energy conversion system 100 components, are stowed in their fully retracted and secure positions. Also stored in carriage assembly is all the other equipment needed to deploy the wind turbine assembly 10 such as tools, spare parts, and rigging.

Thus, all components and systems of the wind turbine assembly 10 (other than the carriage assembly) reside in the carriage assembly 12 and typically weigh only about 8,000 pounds in total (with 20 kW of battery storage capacity). The fully loaded carriage assembly 12 resting on the suspension system 52 is attached to the back of a standard truck or any other suitable vehicle via towing assembly 62 and then driven to the desired site.

When the truck arrives at the chosen windy location with the stowed wind turbine assembly 10, the carriage assembly 12 is detached from the truck and the wind turbine assembly 10 is ready for set-up. Preferably, the carriage assembly 12 is parked so its front faces directly into the wind. Then each gate lock 42 is unlocked and each of the four outriggers 46 is unfolded or swung out about its hinges 47 and each respective control arm 44 fully extended so the outriggers are equally spaced by the control arms 44 from the frame 50 of the carriage assembly 12. Each outrigger 46 is unfolded such that it is positioned at a 45-degree angle to the center of the main central mast, which is located at the center of the carriage assembly 12. This is important because it means the stability of the carriage assembly is equal regardless of the direction of the wind. The control arms 44 are secured and outrigger jacks 48 placed at exactly even spacing level for the outriggers 46, resulting in evenly spaced stability loads aligned with the center of the telescoping mast 16 when it is raised. The carriage assembly 12 may then be raised on the four jacks 48 using level gauges to assure level.

At this stage, the installer turns to the telescoping mast 16. First, the turnbuckles 23 are removed and the hub support lowered. Now the mast sections 18 can be pulled out to extend the telescoping mast 16 to its full size. More particularly, the installer pulls out the first internal mast section 18a until the studs 142 poke through the holes at full extension. In exemplary embodiments, there are four studs, and four corresponding lug nuts 144 are used to draw the first internal mast section 18 tight and centered in its extended position. These steps are repeated for the remaining internal mast sections 18b and 18c.

Once the telescoping mast has been fully extended horizontally beyond the front end of the carriage assembly 12, the rotor 111 can be assembled. The blades 114 are removed from the storage rack and installed into rotor hub 112. Exemplary embodiments use five blades 114, and the root 138 of each blade 114 is inserted into the rotor hub 112 in the hollow center areas. The blades 114 are secured using bolts, preferably six bolts on each blade, and the six bolts are tightened. During set-up of the rotor 111, the hub 112 may be secured to the drive shaft 116 using an additional several bolts around the drive shaft 116. The hub 112 and blades 114 face the front of the carriage assembly 12 when raising and lowering the telescoping mast 16.

The energy conversion system 100 is attached and secured to the top of the telescoping mast 16. More particularly, the nacelle 102 is bolted to the slewing bearing, which is secured to the mast cap 28. The mast cap 28 is bolted to the upper mast section 18a.

The installer may now install one or more wind direction instruments 140, such as an ultrasonic wind anemometer. Exemplary embodiments use VAISALA instruments, but any suitable anemometer could be used. In exemplary embodiments, the VAISALA ultrasonic wind speed and wind direction sensor 140 is fitted to the top of a two-inch square aluminum mast that is roughly 12-15 feet in length, or about two feet taller than the highest blade height. The lower end of the telescoping mast 16 is slipped into a square tube socket and secured.

The main control panel 134 can now be turned on. The installer applies the "parking brake," i.e., disc brake 36, to maintain the rotor 111 in place in preparation for raising the telescoping mast 16. Mounted between the top of the uppermost mast section 18a and the underside of the nacelle deck is an electric motor driven slewing gear programmed to realign the azimuth angle based on wind direction from the wind direction instrument 140.

The telescoping mast 16 is raised now using the a handheld control and with the assistance of the hydraulic ram assembly 20. Hydraulic ram assembly 20 raises the fully extended telescoping mast 16 from a horizontal position to a vertical position. The lock-out valve 34 prevents the hydraulic ram assembly 20 from losing pressure so the telescoping mast 16 won't lower itself uncontrolled. Advantageously, exemplary methods allow the wire and hydraulic brake line to extend, wind up, and rotate without damage to the wires and hose. A product called Kabelschleppe can be used in the mast sections 18 to guide the wire and hose assembly. A custom metal fabrication guides this assembly from the rear carriage area into the lower opening of the telescoping mast 16 when raising and lowering. The mast 16 can be guided using small (2×2×2") plastic (ultra high molecular weight—UHMW) blocks (left and right) to keep the mast sections centered when telescoping, and Kabelschleppe may have an internal trough to roll out/in and stay centered in the process.

When the telescoping mast 16 is in its vertical position so the wind turbine assembly 10 is at its full height, the installer can press the track button to allow the rotor 111 to face the wind. The parking brake (disc brake 36) is released so the rotor 111 can start spinning. It should be noted that the rotor 111 will spin even in very low windspeeds, e.g., under 10 mph. The slewing azimuth gear drive is powered to face the nacelle 102 and rotor 111 into the wind as it changes direction. A programmable logic controller (PLC) receives wind speed and wind direction data. With this data the PLC instructs the azimuth motor to steer left or right to maintain proper facing of the wind turbine assembly. A pivot rod 30 may be provided to move linkages of components as needed.

The operator can follow certain steps, known to one of ordinary skill in the art, to enable run and produce electrical energy. These include ensuring adequate wind velocity (10 MPH average), ensuring that any electrical power generated has a proper place to be delivered, ensuring that the 48 VDC battery system can accept the power generated by the alternator, and/or ensuring that the mini grid has a load that can accept the power output of the inverter. The operator should also confirm that the battery breakers and inverter power switch are closed, confirm that all HMI settings are on automatic, confirm that the parking brake (disc brake 36) is released and the brake pressure is at zero, and confirm that the azimuth motor has positioned the rotor to face the wind. The alternator lock switch should be released, and the automatic motor startup will raise the rotor RPM to approximately 20 RPM and then release. Advantageously, wind turbine assembly 10 has a battery charge feature. With the wind turbine assembly 10 operating, the battery charge feature will automatically direct the alternator output into the battery and the AC output into the spider box, the diversion load, or the grid, if connected.

When the wind turbine assembly 10 is operating, a number of innovative features advantageously provide alignment of loads and forces. Stability under strong wind loads is equal in all directions due to the equal spacing and location of the four outriggers 46 and jacks 48, with the load forces focused exactly on the center of the upright telescoping mast 16. The loads of the all the tubes or frame members of the carriage assembly 12 are centered with shear panels in the neutral axis. Additionally, the nacelle 102 has overhung loads at both ends. These are equal and balanced, and their counter-rotating character produces offsetting gyroscopic forces. The blades 114 also impose their power forces exactly into the center of the main drive shaft 116 with no excentric forces. Blades 114 have a high aspect ratio and advantageously capture 48% of the kinetic energy in the wind as long as they maintain an optimum tip-speed-ratio in a variable speed wind environment. The tip-speed-ratio is maintained with the PLC load control.

Wind turbine assembly 10 will continue to generate electricity autonomously until there is no place to send the electrical power, the electrical power is no longer needed, and/or other conditions require shutdown, at which time it will shut itself down. Conditions or reasons for shut down include, but are not limited to, extreme weather, no place to deliver electrical energy, vibration/verticality, the operator is done producing power at the location, service or maintenance is required, and/or a decision is made to secure operation.

To uninstall the wind turbine assembly 10, the above steps are performed in reverse. The rotor 111 is turned out of the wind direction to reduce wind energy and the disc brake 36 is applied to lock the rotor 111. The telescoping mast 16 can remain vertical and in position to restart if weather conditions are not extreme. When in doubt, and depending on the length of time the machine will be shutdown, it may be prudent to lower the mast, remove and store the blades to prevent damage, and retract the mast sections. Local security conditions could also be considered.

To continue the deinstallation, the steering motor is used to face rotor 111 towards the front of the carriage assembly 12. More particularly, rotation is secured by applying the hydraulic brake and alternator lock, and the rotor 111 is steered to face the front of the carriage so that is will be parallel to the ground when lowered. The telescoping mast 16 is lowered from its vertical position to the horizontal position using the handheld control.

The lock-out valve 34 of the hydraulic ram assembly 20 requires an applied pressure to open the valve while lowering the telescoping mast 16. It should be noted that the electric alternator lock should not be applied at medium or greater power. The hydraulic brakes using pendant can be applied at any speed. The main control panel 134 is turned off and the wind direction instruments 140 may be detached. The six blade bolts are loosened and the blades 114 are removed from the hub 112.

The lug nuts 144 are loosened or removed and the studs 142 are pressed into the holes so the internal mast section 18a, then 18b, then 18c, can be pushed back into each other and finally slidably disposed back inside base or external mast section 18d. The carriage assembly 12 can now be lowered using the four jacks 48. The installer then detaches or disengages each of the control arms 44 and folds each of the outriggers 46 about its respective hinges 47 so the outriggers 46 are again folded parallel to the frame 50 of the carriage assembly 12. Advantageously, the outriggers 46 lock in this shipping position. The rotor 111 and nacelle 102 containing the energy conversion system 100 components stay in place and are again placed in their retraced and secure stowed position. Thus, the fully loaded carriage assembly 12 resting on the suspension system 52 can once again be attached to the back of a suitable vehicle via towing assembly 62 and then driven away from the site.

Thus, it is seen that wind turbine assemblies and deployment methods are provided. It should be understood that any of the foregoing configurations and specialized components or chemical compounds may be interchangeably used with any of the systems of the preceding embodiments. Although illustrative embodiments are described hereinabove, it will be evident to one skilled in the art that various changes and modifications may be made therein without departing from the disclosure. It is intended in the appended claims to cover all such changes and modifications that fall within the true spirit and scope of the disclosure.

While disclosed systems, devices, and methods have been described in terms of what are presently considered to be the most practical and optimal embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A wind turbine assembly comprising:
   a telescoping mast having a top and a bottom, a mast roller system, and a plurality of mast sections, at least one of the mast sections being an internal mast section and at least one of the mast sections being an external mast section;
   an energy conversion system mounted to the top of the telescoping mast;
   a carriage assembly supporting the telescoping mast; and
   an outrigger assembly connected to the carriage assembly, the outrigger assembly including at least one control arm and at least one gate lock;
   wherein the mast roller system enables one or more of the at least one internal mast sections to be pulled out from the at least one external mast section, thereby facilitating extension of the telescoping mast; and wherein the at least one control arm folds the outrigger assembly parallel to the carriage assembly and the at least one gate lock locks the outrigger assembly to the carriage assembly.

2. The wind turbine assembly of claim 1 wherein the telescoping mast has a retracted position in which one or more of the at least one internal mast sections are contained within each other and an extended position in which at least one of the mast sections is pulled out.

3. The wind turbine assembly of claim 2 wherein when the telescoping mast is in the extended position the telescoping mast extends to a length of 50 feet.

4. The wind turbine assembly of claim 1 further comprising a suspension system supporting the carriage assembly and a towing assembly connected to the suspension system.

5. The wind turbine assembly of claim 1 wherein the energy conversion system includes a steering system, a drive assembly, a rotor hub, and a plurality of blades extending from the rotor hub.

6. The wind turbine assembly of claim 5 wherein the plurality of blades comprises five blades.

7. The wind turbine assembly of claim 1 wherein the plurality of mast sections comprises four mast sections.

8. The wind turbine assembly of claim 1 further comprising a hydraulic ram assembly to rotate the telescoping mast to a vertical position.

9. The wind turbine assembly of claim 8 wherein the hydraulic ram assembly comprises a lock-out valve preventing pressure loss.

10. The wind turbine assembly of claim 1 wherein the mast roller system comprises a plurality of inner wheels mounted on one or more roller axles.

11. A wind turbine assembly comprising:

a telescoping mast having a top and a bottom, a mast roller system, and a plurality of mast sections, at least one of the mast sections being an internal mast section and at least one of the mast sections being an external mast section;

an energy conversion system mounted to the top of the telescoping mast;

a carriage assembly supporting the telescoping mast; and an outrigger assembly connected to the carriage assembly, the outrigger assembly including at least one control arm and at least one gate lock;

wherein the mast roller system enables one or more of the at least one internal mast sections to be pulled out from the at least one external mast section, thereby facilitating extension of the telescoping mast;

wherein the telescoping mast has a retracted position in which one or more of the at least one internal mast sections are contained within each other and an extended position in which at least one of the mast sections is pulled out;

wherein when the telescoping mast is in the retracted position the telescoping mast fits in a 20-foot shipping container; and wherein the at least one control arm folds the outrigger assembly parallel to the carriage assembly and the at least one gate lock locks the outrigger assembly to the carriage assembly.

12. The wind turbine assembly of claim 11 further comprising a hydraulic ram assembly to rotate the telescoping mast to a vertical position.

13. The wind turbine assembly of claim 12 wherein the hydraulic ram assembly comprises a lock-out valve preventing pressure loss.

14. The wind turbine assembly of claim 11 wherein the mast roller system comprises a plurality of inner wheels mounted on one or more roller axles.

\* \* \* \* \*